(12) United States Patent
Brandt

(10) Patent No.: US 11,240,966 B2
(45) Date of Patent: Feb. 8, 2022

(54) SLOPE MOWER WITH SAFETY FEATURES

(71) Applicant: Embankscape Equipment LLC, Suamico, WI (US)

(72) Inventor: Michael D. Brandt, Suamico, WI (US)

(73) Assignee: Embankscape Equipment LLC, Suamico, WI (US)

( * ) Notice: Subject to any disclaimer, the term of this patent is extended or adjusted under 35 U.S.C. 154(b) by 118 days.

(21) Appl. No.: 16/530,873

(22) Filed: Aug. 2, 2019

(65) Prior Publication Data
US 2021/0029883 A1    Feb. 4, 2021

(51) Int. Cl.
| | | |
|---|---|---|
| *B60R 22/00* | (2006.01) | |
| *E05F 15/00* | (2015.01) | |
| *G05D 1/00* | (2006.01) | |
| *G05D 3/00* | (2006.01) | |
| *G06F 7/00* | (2006.01) | |
| *G06F 17/00* | (2019.01) | |
| *A01D 75/28* | (2006.01) | |
| *A01D 34/00* | (2006.01) | |
| *A01D 34/86* | (2006.01) | |
| *B60W 10/04* | (2006.01) | |
| *B60W 10/30* | (2006.01) | |
| *A01D 101/00* | (2006.01) | |
| *A01D 34/66* | (2006.01) | |

(52) U.S. Cl.
CPC ........... *A01D 75/28* (2013.01); *A01D 34/008* (2013.01); *A01D 34/86* (2013.01); *B60W 10/04* (2013.01); *B60W 10/30* (2013.01); *A01D 34/66* (2013.01); *A01D 2101/00* (2013.01); *B60W 2300/15* (2013.01); *B60W 2520/00* (2013.01); *B60W 2710/06* (2013.01); *B60W 2710/305* (2013.01)

(58) Field of Classification Search
CPC ...... A01D 75/28; A01D 34/008; A01D 34/86; A01D 2101/00; A01D 34/66; A01D 75/20; B60W 10/04; B60W 10/30; B60W 2710/06; B60W 2300/15; B60W 2520/00; B60W 2710/305
USPC ............................................ 701/48
See application file for complete search history.

(56) References Cited

U.S. PATENT DOCUMENTS

| | | | | |
|---|---|---|---|---|
| 3,885,112 A | * | 5/1975 | Duncan ................. | H01H 35/00 200/61.44 |
| 7,318,493 B2 | | 1/2008 | Medina | |

(Continued)

OTHER PUBLICATIONS

"Built for All You Do" brochure by Steiner, 2015, 11 pages.
(Continued)

*Primary Examiner* — Mahmoud S Ismail
(74) *Attorney, Agent, or Firm* — Stephen C. Jensen; Northwind IP Law

(57) ABSTRACT

Mowing systems include a mower and, optionally, a remote control unit such as a handheld unit, between which may be provided 1- or 2-way communications. Components and features are included in the mower, the remote control unit, or both to enhance the safety, functionality, or user experience of the system's user/operator. One aspect relates to monitoring a tilt angle of the mower, and defining or executing different system responses as a function of different first and second conditions that relate to the tilt angle. Another aspect relates to automatic adjustment of a speed setting of the mower's drive system as a function of a power takeoff (PTO) unit of the mower.

20 Claims, 18 Drawing Sheets

(56) References Cited

U.S. PATENT DOCUMENTS

| | | | |
|---|---|---|---|
| 7,677,344 B2 | 3/2010 | Medina et al. | |
| 8,027,761 B1 | 9/2011 | Nelson | |
| 8,634,960 B2 | 1/2014 | Sandin et al. | |
| 8,954,193 B2 | 2/2015 | Sandin et al. | |
| 9,137,943 B2 | 9/2015 | Einecke et al. | |
| 9,794,652 B2 | 10/2017 | Nohra et al. | |
| 10,037,038 B2 | 7/2018 | Sandin et al. | |
| 2005/0108999 A1* | 5/2005 | Bucher | A01D 75/28 56/10.2 R |
| 2007/0198159 A1 | 8/2007 | Durkos et al. | |
| 2007/0294991 A1 | 12/2007 | Medina et al. | |
| 2009/0201650 A1 | 8/2009 | Hauser et al. | |
| 2009/0232506 A1 | 9/2009 | Hudson et al. | |
| 2010/0191408 A1* | 7/2010 | Boylston | A01D 75/28 701/31.4 |
| 2013/0041577 A1* | 2/2013 | Puhalla | B60W 40/11 701/124 |
| 2014/0059991 A1 | 3/2014 | Dixon | |
| 2017/0079210 A1* | 3/2017 | Yoshimatsu | F02D 29/02 |
| 2017/0245429 A1* | 8/2017 | Kuriyagawa | A01D 43/0631 |
| 2017/0335818 A1 | 11/2017 | Dwyer | |
| 2017/0347521 A1 | 12/2017 | Tjernberg et al. | |
| 2018/0352735 A1 | 12/2018 | Balutis et al. | |
| 2019/0384287 A1 | 12/2019 | Hyakusawa | |
| 2020/0187421 A1* | 6/2020 | Aoki | A01D 75/18 |
| 2021/0132624 A1 | 5/2021 | Andriolo et al. | |
| 2021/0255638 A1 | 8/2021 | Ma et al. | |

OTHER PUBLICATIONS

FireMaster FM72-88D brochure by kut kwick, undated but no later than Apr. 2019, 2 pages.

Gravely 2019 Product Catalog, 2018, 33 pages.

Green Climber F300 PRO brochure, undated but no later than Apr. 2019, 4 pages.

Green Climber LV300 PRO brochure, undated but no later than Apr. 2019, 1 page.

Green Climber LV800 PRO brochure, undated but no later than Apr. 2019, 1 page.

Green Climber LV600 brochure, undated but no later than Apr. 2019, 5 pages.

Pro-Turn 200 brochure by Gravely, 2018, 2 pages.

Ridge Runner brochure by Alamo, dated "Jun. 8, 2016", 2 pages.

Ridge Runner brochure by Alamo, dated "Jun. 17, 2016", 12 pages.

ROBOCUT 2019 brochure, Jan. 2019, 19 pages.

Slope Solution ATM 72LC brochure by Harper Turf Equipment, undated but no later than Apr. 2019, 2 pages.

Spider brochure by Dvorak, undated but no later than Apr. 2019, 20 pages.

Super SlopeMaster SSM-36-72D brochure by kut kwick, undated but no later than Apr. 2019, 2 pages.

The Kut Kwick Brushmaster BM72-88D brochure by kut kwick, undated but no later than Apr. 2019, 2 pages.

The MegaSlopeMaster MSM72-88D brochure by kut kwick, undated but no later than Apr. 2019, 2 pages.

TRAXXRF brochure by Alamo Industrial, dated "Mar. 28, 2014", 2 pages.

TRAXXRF brochure by Alamo Industrial, dated "Dec. 9, 2014", 8 pages.

Ventrac Commercial brochure, Nov. 2018, 12 pages.

"Dangers of Roll-Overs of Riding Mowers" informational document by OSHA, undated but no later than Apr. 2019, 9 pages.

McConnel Remote, https://www.mcconnel.com/remote-control-technology/_product/20/robocut/, undated but no later than May 31, 2019, 1 page.

* cited by examiner

SLOPE MOWER WITH SAFETY FEATURES

FIELD OF THE INVENTION

The present invention relates to systems for mowing grass, weeds, brush, and the like, with particular focus on such systems that allow the mower to be controlled remotely e.g. using a handheld unit or other remote control unit, as well as systems in which the mower is adapted for use on moderately- to highly-sloped terrain surfaces. The invention also pertains to related methods, systems, and articles.

BACKGROUND OF THE INVENTION

Numerous types of residential, commercial, and industrial mowing systems are known. The vast majority of such systems are configured for manual control by a single user who pushes, or in some cases sits atop, a mower unit. The vast majority of such systems are also configured for use on terrain that is flat or gently sloped, e.g. for terrain whose slope angle may range from 0 degrees (flat and level) to 22 degrees. Furthermore, many known riding mowers are equipped with separate left-wheel and right-wheel control handles by which the user can move the mower forward, reverse, and through a range of turns, including forward turns, backward turns, and so-called zero-turns, i.e., maneuvering the mower through a turn whose turn radius is essentially zero.

There are also some known mowing systems that employ a remote control unit to maneuver and control the mower from a distance, as well as some that employ a mower specially designed to operate on terrain whose slope angle is greater than 22 degrees, such mowers known in the art as "slope mowers". See for example U.S. Pat. No. 7,677,344 (Medina et al.) and U.S. Pat. No. 8,634,960 (Sandhi et al.).

SUMMARY OF THE INVENTION

Slope mowers and systems that employ them have unique operational and functional challenges due to the elevated dangers and difficulties associated with sliding, falling, overturning, and maneuvering on steeply sloped terrain. Remotely controlled mower systems also have their own operational and functional challenges, such as how to prevent a powerful cutting device that has its own source of locomotion from losing control or otherwise jeopardizing the safety of the user/operator as well as bystanders. The present inventors have recognized a need for incorporating new, innovative features to mower systems—especially remotely controlled slope mower systems—that can enhance the safety, functionality, or other utility of the system. The disclosed enhancements satisfy one or more of those needs and form the basis for new families of remote-control mower systems and methods, and other mower systems.

This document actually discloses a number of such enhancements, each of which is described in more detail below. The enhancements may be implemented individually in a given mower system, or in combinations as desired. One aspect relates to monitoring a tilt angle of the mower, and defining or executing different system responses as a function of different first and second conditions that relate to the tilt angle. Another aspect relates to automatic adjustment of a speed setting of the mower's drive system as a function of a power takeoff (PTO) unit of the mower.

One aspect relates to a mower that includes a frame, an engine attached to the frame, mower blades attached to the frame and selectively coupled to the engine by a power takeoff (PTO) unit, a controller configured to separately control the PTO unit and the engine, and an inclinometer attached to the frame and coupled to the controller, the inclinometer providing an inclinometer output indicative of a tilt angle of the frame. The controller may be configured to turn the PTO unit off but keep the engine on when the inclinometer output satisfies a first condition, and configured to turn the engine off when the inclinometer output satisfies a second condition.

Another aspect relates to a mower that includes an engine, a power takeoff (PTO) unit, a controller configured to separately control the PTO unit and the engine, the controller including a central processing unit (CPU) and a memory unit in which instructions are stored, and an inclinometer coupled to the controller, the inclinometer providing an inclinometer output indicative of a tilt angle of the mower. The instructions may be configured to turn the PTO unit off but keep the engine on when the inclinometer output satisfies a first condition, and configured to turn the engine off when the inclinometer output satisfies a second condition.

Another aspect relates to a method of operating a slope mower having an engine, a power takeoff (PTO) unit, an inclinometer, and a controller configured to separately control the PTO unit and the engine. The method may include turning the PTO unit off but keeping the engine on when an output of the inclinometer satisfies a first condition, and turning the engine off when the output of the inclinometer output satisfies a second condition.

Another aspect relates to a mower that includes an engine, a PTO unit, a drive system, and a controller. The drive system may include a left drive wheel, a right drive wheel, a left actuator, and a right actuator, the left actuator having a position that controls a speed of the left drive wheel, and the right actuator having a position that controls a speed of the right drive wheel. The controller may be coupled to the PTO unit and to the left and right actuators of the drive system, and may be configured to provide first drive signals to the first and second actuators when the PTO unit is off, and second drive signals to the first and second actuators when the PTO unit is on, the first drive signals characterized by a first maximum drive speed and the second drive signals characterized by a second maximum drive speed, the second maximum speed being less than the first maximum speed.

Numerous related methods, systems, and articles are also disclosed.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The inventive articles, systems, and methods are described in further detail with reference to the accompanying drawings, of which.

In the figures, like reference numerals designate like elements.

DETAILED DESCRIPTION OF ILLUSTRATIVE EMBODIMENTS

We have developed new families of remote-control slope mowing systems and methods. Embodiments thereof may use or include one or more of the innovative ideas and features discussed further below to enhance the safety, functionality, or other utility of the system. Most if not all of the innovative features are of particular utility in slope mowing systems configured for remote control operation, but the reader will appreciate that many can also be applied to other types of mowing systems, including in some cases mowing systems that are not remotely controlled, and mowing systems in which the mower is not a slope mower. Of the various different features or enhancements described herein, a given mowing system may incorporate only one such feature, or only two such features, or any combination of such features.

Figure 1:
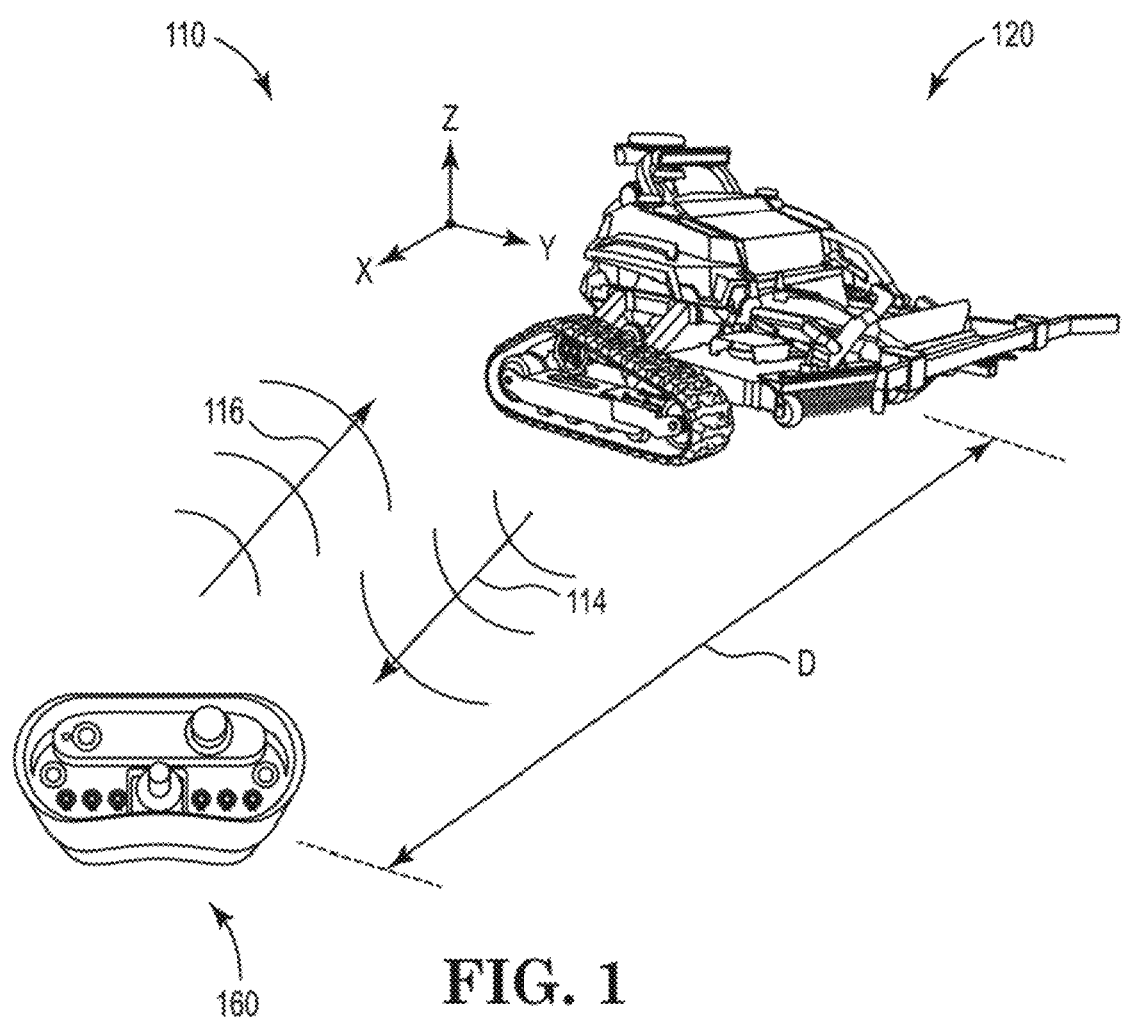
FIG. 1 is a schematic perspective view of a slope mower and a remote handheld unit, forming a slope mower system.

A schematic diagram of a representative mowing system 110 is shown in FIG. 1. The system 110 is made up of two main subsystems or units: a mower 120, and a remote control unit 160. These two units communicate according to at least a 1-way protocol—from the remote control unit 160 to the mower 120—to allow a user to control the operation of the mower 120 by manipulating input device(s) on the unit 160. For many of the disclosed enhancements, however, 2-way communications are necessary or at least desirable as explained further below. Hence, FIG. 1 depicts both mower-generated signals 114 and remote control unit-generated signals 116. The mower 120 may thus include, besides one or more antennas, a signal generator, transmitter, receiver, transceiver, or other electronic device(s) capable of generating the mower's outgoing signals 114 and detecting the incoming signals 116 from the remote control unit 160. Likewise, the remote control unit 160 may include a signal generator, transmitter, receiver, transceiver, or other electronic device(s) capable of generating the unit's outgoing signals 116 and detecting the incoming signals 114 from the mower 120.

The communication devices used in the mower 120, in the remote control unit 160, or in both may transmit and receive electromagnetic radiation wirelessly in any suitable frequency/wavelength band. Typically, radio frequency (RF) radiation, more particularly the microwave band (0.3 GHz-300 GHz), and more specifically the ultra high frequency (UHF) band (0.3 GHz-3 GHz) are of particular utility. One example of a suitable RF frequency is 2.4 GHz. In other cases, higher RF frequencies can be used, such as the super high frequency (SHF) band (3 GHz-30 GHz) in which cell phone communication systems operate. In other cases, optical or near-optical frequencies, such as emitters and receivers operating in the far-, mid-, or near-infrared band, may be used. The particular frequency or frequency band chosen for the wireless communications for the system 110 will determine the optimal design details of what antenna(s) or other emitting or detecting devices are to be used in the mower 120 and in the remote control unit 160.

In FIG. 1 the mower signals 114 are shown propagating towards the remote control unit 160, and the signals 116 are shown propagating towards the mower 120, but in most cases an antenna will broadcast signals in substantially all directions. In this regard, although wireless communications may occur directly between the mower 120 and the remote control unit 160 as suggested in FIG. 1, the communications may alternatively occur indirectly, with the addition of one or more other transmit/receive devices. For example, communication devices in the mower 120 may communicate with a nearby cell phone tower (not shown) or other communication hub, and communication devices in the remote control unit 160 may communicate with the same communication hub, thus establishing indirect but actual communication between the remote control unit 160 and the mower 120 by way of the communication hub.

The mower 120 may be configured as a slope mower as shown in FIG. 1. As such, it may have a track base (or wheel base) that is wide enough, and a profile or height that is low enough, to allow it to operate on slopes greater than 22 degrees without undergoing unsafe slides, falls, turnovers, or the like. For reference purposes we may define a local coordinate system whose orientation is fixed to the body of the mower 120 to help describe the orientation of the mower 120 relative to its surroundings. See in this regard the Cartesian x-y-z coordinate system of FIG. 1, where the y-axis defines back-to-front, the x-axis defines side-to-side, and the z-axis is along the height of the mower.

The remote control unit 160 may be sized and otherwise configured to be carried by the operator/user who uses it to operate the mower 120 from a safe distance. The unit 160 may thus for example have a size, weight, and shape that allow it to be easily carried by a typical operator/user while the user walks about on or near the terrain to be cut. The unit 160 may be configured with left and right handles for grasping by the user's hands, or with a strap for hanging about the user's neck, or with a strap for attaching to the user's waist, or with any two or all three of these features. In any such case, due to its mobile design, we may refer to the remote control unit 160 alternatively as a remote handheld unit, or more simply as handheld unit 160 or handheld 160. For reference purposes we may define a local coordinate system whose orientation is fixed to the body of the handheld unit 160 to help describe the orientation of the handheld unit relative to its surroundings. Although not shown in FIG. 1, such a local coordinate system is shown in FIG. 3.

The proximity or distance between the mower 120 and the handheld 160 is labeled in FIG. 1 as distance D. This distance will be discussed further below in connection with a safety feature that employs proximity devices in both the mower 120 and the handheld 160. The distance D may be measured or expressed either in standard units such as inches, feet, or meters, or in relative or non-standard units.

Figure 2:
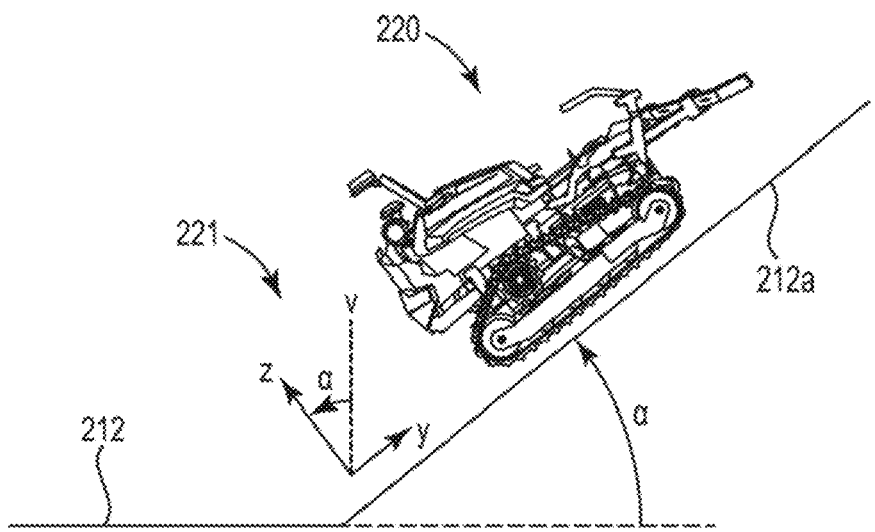
FIG. 2 is a schematic side view of a mower operating on sloped terrain, thus in a tilted state.

A slope mower 220, which may be the same as or similar to mower 120, is shown in FIG. 2 in the context of an idealized terrain 212 on which grows grass, brush, or the like (not shown). The terrain 212 has a flat, level portion adjacent a portion 212a that is sloped at a constant angle α (alpha) relative to an earth-centric horizontal plane. A local x-y-z coordinate system 221 is referenced to the mower 220 in similar fashion to the local coordinate system described above. As a result of the mower 220 being situated on the sloped terrain 212a, the local coordinate system 221 is tilted by the same angle α, as measured between an earth-centric vertical axis v and the z-axis (height direction) of the mower 220. In the depicted orientation of the mower 220, the tilt angle α is in the y-z plane. If the mower 220 were rotated counterclockwise by 90 degrees about the z-axis, the tilt angle α would be in the x-z plane of the local coordinate system.

Figure 3:
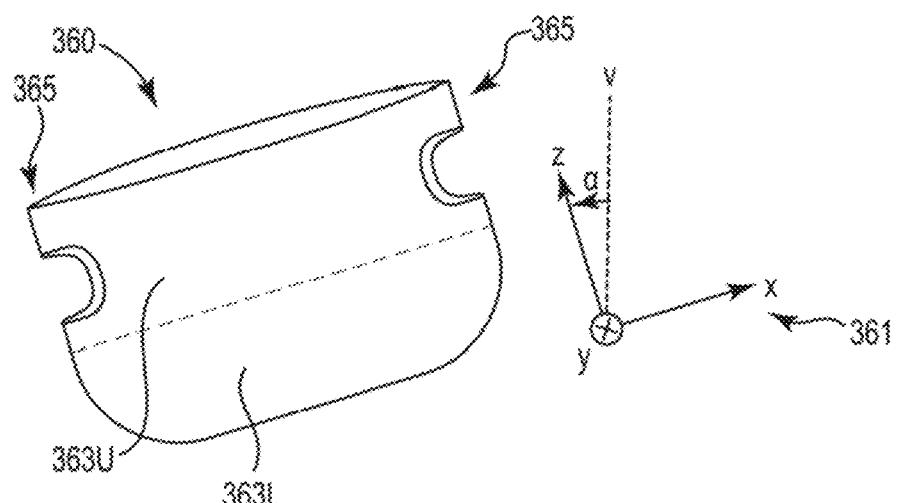
FIG. 3 is a schematic side view of a remote handheld unit in a tilted state.

A remote control unit or handheld unit 360, which may be the same as or similar to the previously described unit 160, is shown in FIG. 3. The housing of the unit 360 has openings on opposed sides thereof which form left and right handles 365 in the adjacent housing wall. The unit 360 may have a panel that divides the housing into a lower, closed compartment 363L and an upper, open compartment 363U. Knobs, switches, buttons, joysticks, and other user input devices may be mounted to the panel for access by a user. The user may touch and manipulate such user input devices by reaching with hands or fingers through the large top opening in the housing into the upper compartment 363U. Delicate electronic circuits and components, and batteries, may be mounted and housed in the lower compartment 363L, which may also be sealed to be water-tight. The unit 360 is shown in a tilted state for reasons that will become apparent in the discussion below. A local x-y-z coordinate system 361 is referenced to the handheld unit 360, with the y-axis oriented back-to-front, the x-axis oriented side-to-side, and the z-axis along the height of the unit's housing. The unit is shown tilted in the x-z plane by a tilt angle α, as measured from an earth-centric vertical axis v. If the unit 360 were rotated clockwise by 90 degrees about the z-axis, the tilt angle α would be in the y-z plane of the local coordinate system.

Figure 4:
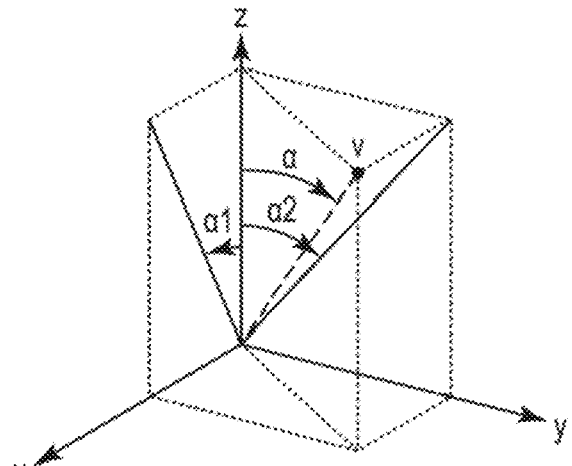
FIG. 4 is a perspective view of a coordinate system showing how a tilt vector or tilt angle can be decomposed into component tilt angles in orthogonal coordinate planes.

The tilt orientations shown in FIGS. 2 and 3 are somewhat idealized insofar as the tilt is shown to occur entirely in the x-z plane or the y-z plane of the local coordinate system. In general, the tilt direction as measured by the position of the earth-centric vertical axis v relative to the local coordinate system will be more complex, neither lying entirely in the x-z plane nor lying entirely in the y-z plane. The distinction can be significant from a practical standpoint if an inclinometer device is used that only provides tilt measurements in the major (x-z and y-z) planes. Stated differently, if an inclinometer device is employed that provides a first tilt measurement in the x-z plane and a second tilt measurement in the (orthogonal) y-z plane, a transformation must be applied to convert those component measurements to a net tilt angle α. FIG. 4 illustrates how a randomly oriented tilt, having a net tilt angle α relative to the z axis of the local coordinate system of a mower or handheld unit, is decomposed into component tilt angles α1, α2 in the orthogonal x-z and y-z planes, respectively. From the Pythagorean theorem we know that:

$$\sin^2(\alpha) = \sin^2(\alpha 1) + \sin^2(\alpha 2)$$

Hence, the net tilt angle α of the mower or the handheld unit can be determined from the measured component tilt angles α1, α2 as follows:

$$\alpha = \sin^{-1}(\operatorname{sqrt}(\sin^2(\alpha 1) + \sin^2(\alpha 2)))$$

Figure 5:
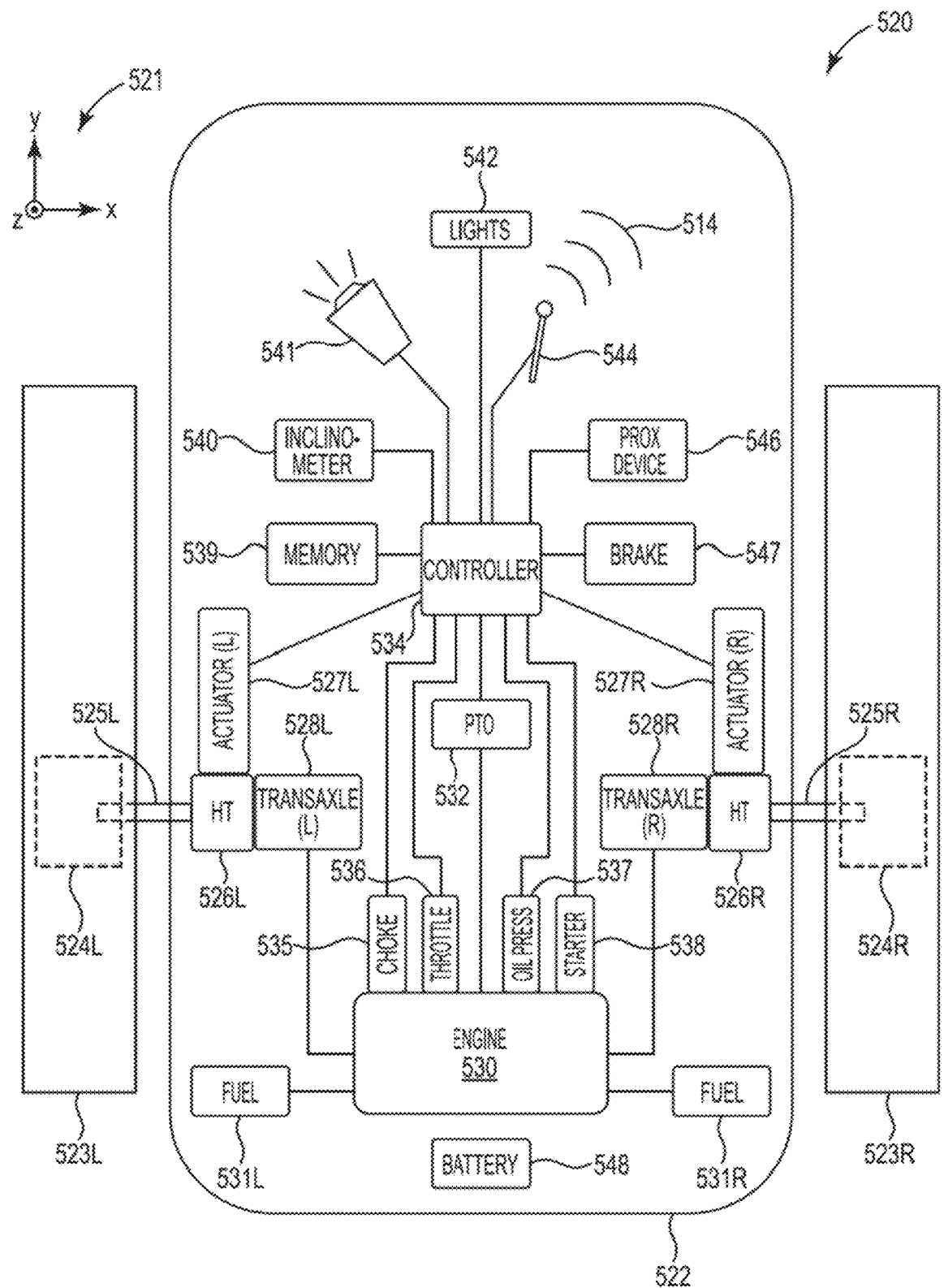
FIG. 5 is a schematic block diagram of a mower.

Turning now to FIG. 5, we see there a schematic block diagram of a mower 520, which may be the same as or similar to previously described mowers 120, 220, and which may be a slope mower. The mower 520 has a local x-y-z coordinate system 521 as described above. The mower includes a main body 522 which is propelled by left and right continuous tracks 523L, 523R. The tracks provide added stability and traction on steep inclines compared to individual wheels, but may if desired be replaced by wheels. The tracks can be driven in a forward or reverse mode by left and right drive wheels 524L, 524R as shown. The wheels 524L, 524R receive their turning torque from left and right transaxles 528L, 528R by way of hydraulic transmissions 526L, 526R and drive axles 525L, 525R. Thus, a given drive wheel 524L, 524R will engage its respective track 523L, 523R to move the mower 520 only to the extent mechanical torque and rotational motion is transmitted from the transaxle 528L, 528R to the drive wheel by the transmission 526L, 526R. In a neutral position, these transmissions transmit no torque or motion to their respective drive wheels, such that the mower remains stationary. In a forward position, a given transmission transmits torque and motion from its transaxle to its drive wheel to move the mower forward, while in a reverse position, torque and rotational motion is transmitted to the drive wheel to move the mower backward. Mechanical control of the transmissions is accomplished by respective left and right linear actuators 524L, 524R which mechanically engage their respective hydraulic transmissions 526L, 526R. A neutral position of a given actuator corresponds to the neutral position of the transmission, and no motion of the associated drive wheel. Positive displacement of the actuator engages the transmission to provide forward motion of the drive wheel, with increased positive displacement yielding increased transmission engagement and increased (forward) drive wheel speeds. Negative displacement of the actuator engages the transmission to provide reverse motion of the drive wheel, with increased negative displacement yielding increased transmission engagement and increased (reverse) drive wheel speeds. Independent control of the left and right transmissions via the left and right actuators can thus produce a full range of motion of the mower 520, from straight forward over a range of speeds (both drive wheels and tracks moving forward at the same speed), to straight backward over a range of speeds (both drive wheels and tracks moving backwards at the same speed), to a range of turns from gradual to sharp to zero-turn (drive wheels moving at different speeds and/or in different directions).

The transaxles 528L, 528R are powered by a suitable engine 530. The engine 530 may be an internal combustion engine powered by gasoline or other suitable fuels supplied to the engine from fuel tanks 531L, 531R. Since the mower may operate in a highly tilted orientation for extended periods, it is advantageous to mount the fuel tanks on opposite sides of the engine so that gravity-induced fuel feed will occur from at least one of the tanks for any given mower orientation. The engine 530 may be equipped with a choke 535, throttle 536, oil pressure gauge 537, and electronic starter 538, among other accessories.

Figure 6:
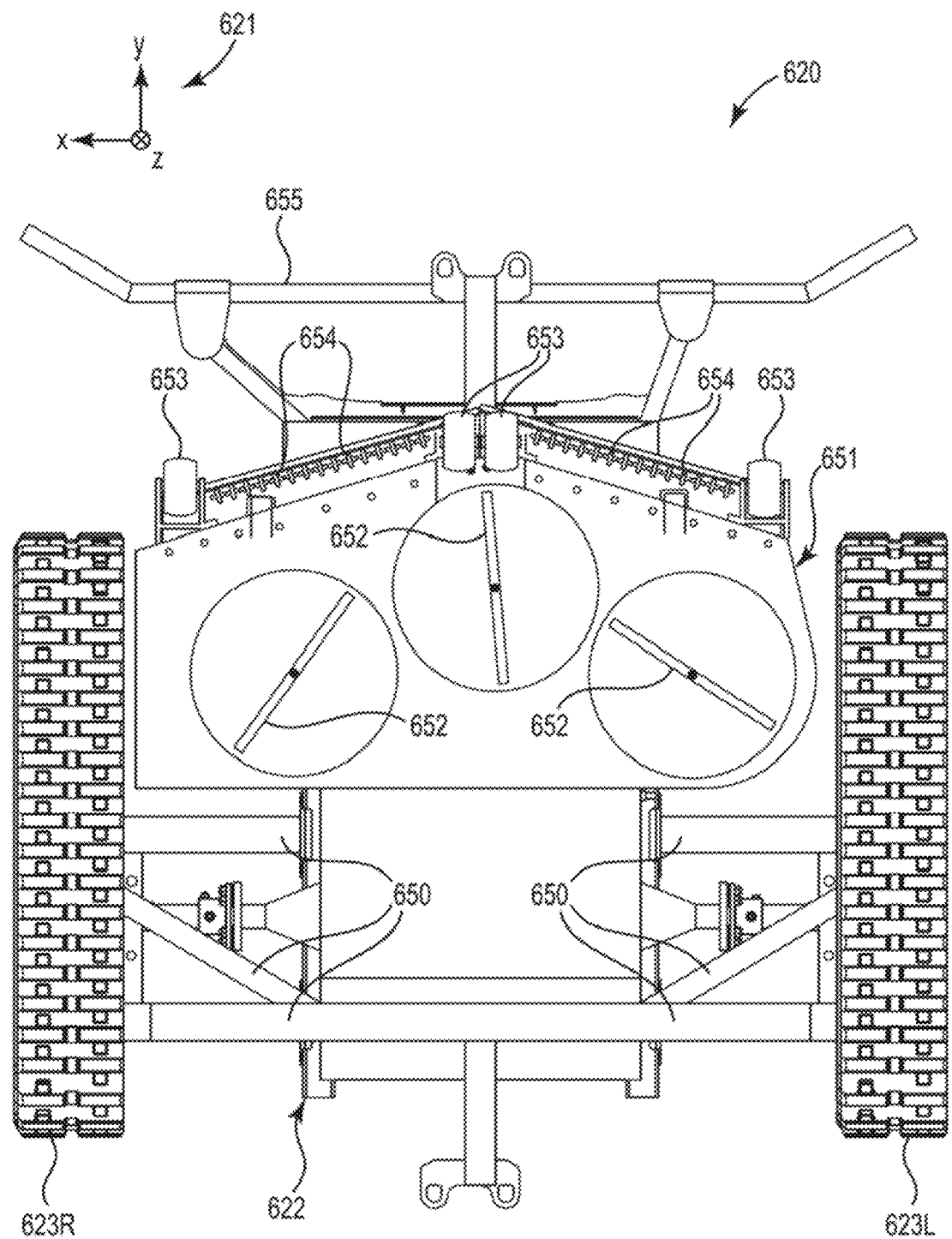
FIG. 6 is a schematic bottom view of a mower.

The engine 530 also engages or drives a power takeoff (PTO) unit 532. The PTO unit serves the function of selectively coupling the engine to the mower blades, examples of which are seen in FIG. 6. Thus, in an ON state, the PTO unit 532 couples the engine to the blades to rapidly spin or rotate the blades and thus cut the grass, weeds, brush, or other vegetation located beneath the mowing deck. In an OFF state, the PTO unit 532 decouples the engine from the blades, causing the blades to remain stationary, thus leaving the underlying vegetation uncut.

The mower 520 also includes a controller 534 which electronically controls or communicates with many other system components over wired connections, including the actuators 527L, 527R, the choke 535, throttle 536, oil pressure gauge 537, and starter 538, and the PTO unit 532. The controller 534 also preferably electronically communicates with an on-board memory 539, inclinometer 540, horn 541, light(s) (discrete or grouped) 542, antenna 544, proximity device 546, and brake 547. The controller 534 may be any suitable digital electronic controller or microcontroller, now known or later developed, that is capable of performing the tasks described herein in the hot, noisy, and high-vibration environment of an engine-powered mower. The controller 534 may include one or more suitable central processing unit (CPU), system clock, dedicated read-only memory (ROM) and random access memory (RAM), and input/output modules, among other features and capabilities. The controller 534 may be or include a single integrated circuit (IC) or circuit board, or it may include multiple such circuit boards and ICs. The separate memory 539 may be or include non-volatile memory, and it may store instructions such as software and firmware which, when loaded into and carried out by the controller 534, cause the controller and mower to perform the tasks described herein. The reader will understand that an electronic engineer of ordinary skill can select the appropriate electronic components and configure them in such a way as to provide the controller 534 and the mower 520 with the functionality as described, without undue experimentation.

In addition to sending control signals to the various components it manages, the controller 534 may also receive diagnostic information including sensor information or other status information from such components. Thus, the wired link between the controller 534 and a given one of the actuators 527L, 527R may allow for both (a) control signals to be sent from the controller to the actuator to cause the actuator to move to the desired position, and (b) diagnostic signals or status information to be sent from the actuator to the controller. The diagnostic signals may for example include one or more actuator fault signals generated by one or more fault sensors that may be included as part of the actuator, or as part of the controller 534, or as an add-on accessory. In exemplary embodiments such a fault sensor may be or include an open circuit detector or a short circuit detector, or both, which monitors electrical continuity between wires or pins of a given actuator. Similarly, the wired link between the controller 534 and the PTO unit 532 also may allow for both (a) control signals to be sent from the controller to the PTO unit to turn the PTO unit ON or OFF, and (b) diagnostic signals to be sent from the PTO unit to the controller. The diagnostic signals may for example include one or more PTO output errors generated by one or more fault sensors that may be included in, or added to, the PTO unit, or that may be part of the controller 534. Again, such fault sensor may be or include an open circuit detector or a short circuit detector, or both, which monitors electrical continuity between wires or pins of the PTO unit. Similar comments and capabilities apply to other components coupled to the controller 534, such as the choke 535, the throttle 536, the oil pressure gauge 537, the inclinometer 540, the horn 541, the lights 542, the proximity device 546, and the brake 547. Thus, for example, the controller 534 may have one or more dedicated circuits or elements that monitor the electrical continuity of any or all of these components, and detect an electrical short or electrical open circuit condition. In some cases the fault sensor may also be or include a voltage or current sensor, e.g. to monitor output characteristics of the battery 548.

The inclinometer 540 may in some cases be omitted from the mower 520 unless the tilt-related capabilities described herein are of interest. The inclinometer 540 may be simple in design and function, or it may be more sophisticated and complex. In some cases the inclinometer may include two or more distinct, e.g. 1-axis, inclinometers. In some cases the inclinometer may be or include a simple switch that is activated when a tilt angle (whether a net tilt angle or a component tilt angle in a given plane) exceeds a preset angle, or a plurality of such switches oriented along different planes of tilt, or a plurality of such switches having different preset angles. In preferred embodiments the inclinometer 540 provides to the controller 534 an analog or digital electronic output signal that represents the actual tilt angle component in a given plane, or the actual net tilt angle, to a fairly high degree of precision, e.g. in increments of 1 degree, or 0.5 degrees, or 0.1 degrees. Stated differently, the inclinometer preferably provides an electronic output signal that is representative of an actual net tilt angle, or one or two actual component tilt angles, and substantially continuously variable over a range of angles, e.g. from 0 to at least 30, 40, 50, 60, 70, or 80 degrees.

The antenna 544 functions—at a minimum—to detect electromagnetic signals broadcast by the handheld unit, whether directly or indirectly. Direct detection involves detecting the handheld-emitted signals such as signals 116 without any intermediacy detection and rebroadcast. Indirect detection involves detecting not the handheld-emitted signals 116 themselves, but a rebroadcast of such signals, the rebroadcast in some embodiments occurring at a different region of the electromagnetic spectrum than that of the original signals 116. If direct detection, and thus direct communication between the mower antenna 544 and that of the handheld unit, is used, the antennas preferably operate in the UHF band of the electromagnetic spectrum. If indirect detection and indirect communication between the mower and the handheld unit is used (e.g. where the units communicate at standard cell phone frequencies using a cell phone tower), the antennas preferably operate in the SHF band. Signals from the handheld unit that are detected by the mower antenna 544 may include information relating to the status (including change of status) of knobs, switches, buttons, joysticks, or other devices (including user input devices) that are included in the handheld unit, and may specifically include handheld unit inclinometer information and handheld unit diagnostic information.

In many embodiments the antenna 544 not only detects signals broadcast by the handheld unit, but also broadcasts mower signals 514 for reception by the handheld unit. In such cases, the mower signals 514 emitted by the antenna 544 may include, for example, mower inclinometer information and mower diagnostic information. The antenna 544 is shown schematically in the figure as a single antenna structure, and so it may be, but it may also be or include two or more antenna structures, e.g. one for receiving incoming signals and one for emitting or broadcasting outgoing signals.

The proximity device 546 may be or include a beacon, a distance-measuring device, a position-measuring device, or any combination thereof. A beacon is simply an electromagnetic emitter that does not itself measure distance or position, but whose output signal can be used by another device, such as a second proximity device on the handheld unit, to determine distance or position. A distance-measuring device can determine or measure a distance to another object, such as to a distant, external beacon or a second proximity device on the handheld unit, but cannot determine a direction to such other object, and thus it cannot determine the position of such other object, nor its own position relative to such other object. A position-measuring device can determine or measure the position of another object, such as an external beacon or a second proximity device, or the position of itself relative to such other object, and thus it can also determine or measure the distance to such other object. An example of a position-measuring device is a global positioning system (GPS) device.

The mower 520 may of course also include one or more batteries 548 to supply the electrical power needs of the starter 538, controller 534, actuators 527L, 527R, and other electronic components of the mower. The battery 548 may be rechargeable, or non-rechargeable.

A bottom view of a mower 620, which may be the same as or similar to mower 520, is shown in FIG. 6. The mower 620 has a main body 622 and left and right continuous tracks 623L, 623R which can turn forward and backward independently of each other at controlled speeds to propel the mower 620 forward, backward, or through various types of turns, including zero-turns. The mower 620 has a local x-y-z coordinate system 621 as described above. The main body 622 includes a welded metal frame 650 for structural support and integrity, and to which other components are mounted or attached. A mower deck 651 is also included, which houses the cutting blades (mower blades) 652. In the depicted embodiment three rotating blade assemblies are shown housed in the mower deck 651, but in other embodiments only one, or only two, or more than three such assemblies may be used as desired. The mower blades 652 are mechanically coupled to the PTO unit, which in turn couples to the mower engine (see FIG. 5). When the PTO unit is ON, the engine causes the mower blades to spin rapidly and cut the grass, weeds, or other vegetation under the mower deck. When the PTO unit is OFF, the mower blades remain stationary.

One or more smaller wheels 653 may also attach to the mower deck 651 for added support and stability. The mower 620 also preferably includes conventional mechanisms (not shown) to adjust the height of the mower deck 651 relative to the ground (terrain) so the user can adjust the grass cut length as desired. The height-adjustment mechanism(s) may be mechanically adjustable by hand, or may be pneumatically, hydraulically, or electronically adjustable, and as such may also be remotely adjustable via a user input device on the handheld unit.

At the front of the mower 620, flying debris may be propelled outward from the gaps between the deck wheels 653 during cutting. To stop or reduce this, the gaps can be substantially filled with rows of hanging chains 654 or other suitable mechanical barriers that substantially prevent the debris from leaving the vicinity of the deck 651. The mower 620 can also be provided with a bumper 655 to give the mower the capability of pushing piles of debris or other large or tall objects, or to protect the main body of the mower from damage due to front-end collisions with large or tall objects. Although the chains 654 and the bumper 655 may serve these functional purposes, details of their design may also be selected to enhance the ornamental appearance of the mower.

Figure 7:
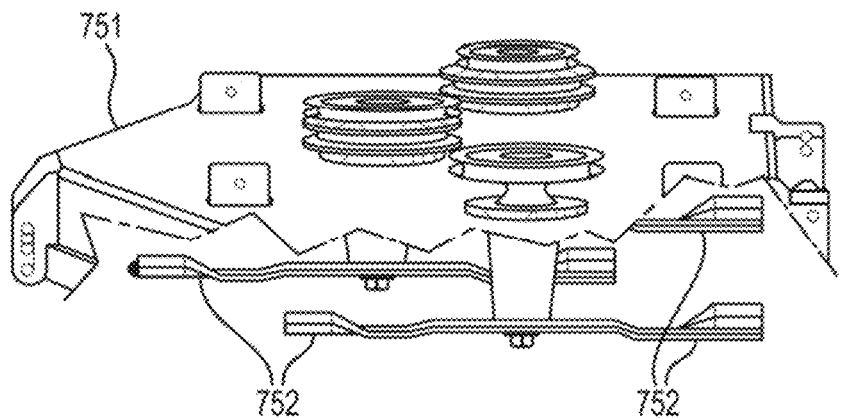
FIG. 7 is a schematic perspective view of a mower deck portion of a mower.

A schematic broken-away perspective view of a portion of a mower deck 751, which may be the same as or similar to the mower deck 651, is shown in FIG. 7. Three sets of mower cutting blades 752 are rotationally mounted beneath the mower deck with suitable bearings, and drive wheels located above the deck. The drive wheels connect to the PTO unit with one or more drive belts. The height of the blades above the ground determines the length of cut of the grass or other vegetation.

Figure 8:
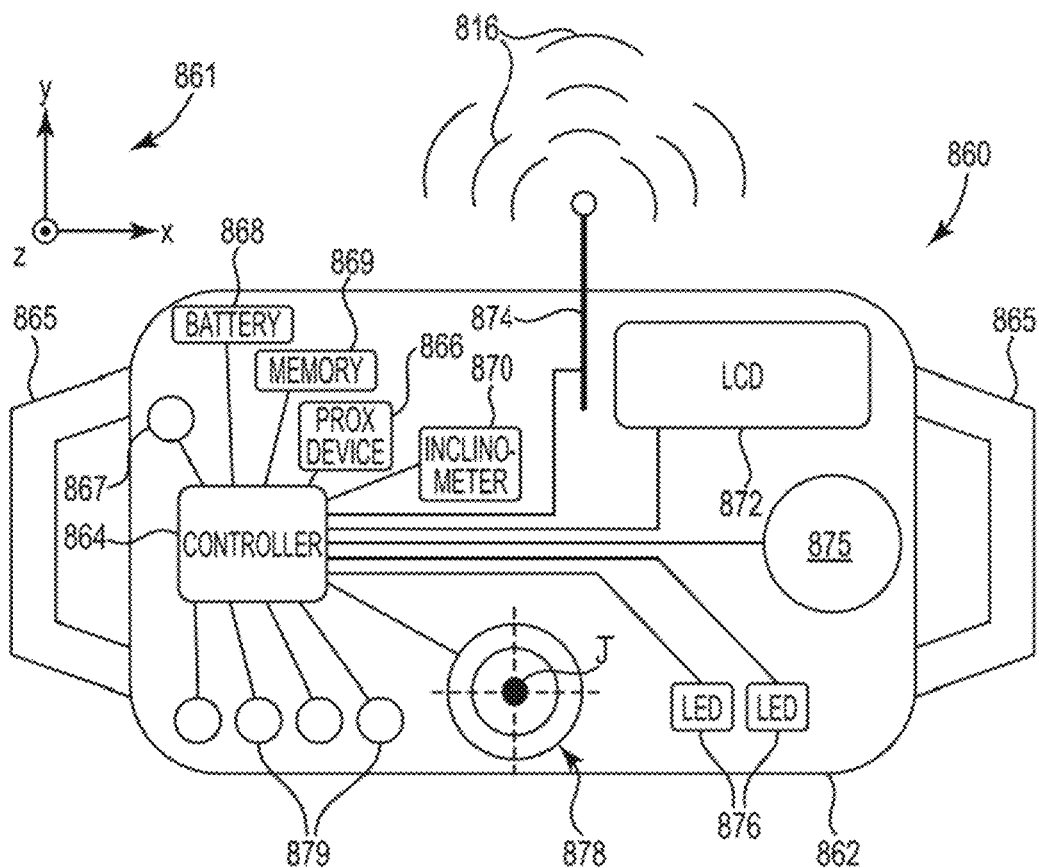
FIG. 8 is a schematic block diagram of a remote handheld unit.

A schematic block diagram of a remote handheld unit (remote control unit) 860 that can be used to control any of the mowers discussed herein is shown in FIG. 8. The unit 860 may be the same as or similar to the units 160 or 360 discussed above. The handheld unit 860 has a housing 862 with optional handles 865, and a local x-y-z coordinate system 861 as described above. Attached to or mounted on or in the housing 862 are a number of electrical components (including electromechanical components and electro-optical components) that work together to give the unit the various functional capabilities described herein. Those components may include some or all of a controller 864, a proximity device 866, an Enable switch 867, a battery 868, a memory 869, an inclinometer 870, a display 872, an antenna 874, an emergency stop ("E-stop") switch 875, one or more discrete light sources 876, a joystick 878, and one or more other user input devices 879, or other components.

The controller 864 electronically controls or communicates with some or all of the other electronic system components of the handheld unit 860 over wired connections. The controller 864 may be any suitable digital electronic controller or microcontroller, now known or later developed, that is capable of performing the tasks described herein under the environmental conditions typically experienced by a remote handheld unit. The controller 864 may include one or more suitable central processing unit (CPU), system clock, dedicated read-only memory (ROM) and random access memory (RAM), and input/output modules, among other features and capabilities. The controller 864 may be or include a single integrated circuit (IC) or circuit board, or it may include multiple such circuit boards and ICs. The separate memory 869 may be or include non-volatile memory, and it may store instructions such as software and firmware which, when loaded into and carried out by the controller 864, cause the controller and handheld unit to perform the tasks described herein. The reader will understand that an electronic engineer of ordinary skill can select the appropriate electronic components and configure them in such a way as to provide the controller 864 and the handheld unit 860 with the functionality as described, without undue experimentation.

In addition to sending control signals to the various components it manages, the controller 864 may also receive diagnostic information including sensor information or other status information from such components. Thus, the wired link(s) between the controller 864 and other components it receives transducer signals from, such as the joystick 878, the proximity device 866, and the inclinometer 870, may allow for both (a) the transducer signal(s) to be sent from the component to the controller 864, and (b) diagnostic signals or status information to be sent from the component to the controller. The diagnostic signals may for example include one or more fault signals generated by one or more fault sensors that may be included as part of the component, or as part of the controller 864, or as an add-on accessory. In exemplary embodiments such a fault sensor may be or include an open circuit detector or a short circuit detector, or both, which monitors electrical continuity between wires or pins of a given such component. Similar diagnostic information can be obtained by the wired connections that couple the controller 864 to other components on the handheld unit, such as those that the controller sends control signals to, e.g. the display 872 or light sources 876. Thus, for example, the controller 864 may have one or more dedicated circuits or elements that monitor the electrical continuity of any or all of these components, and detect an electrical short or electrical open circuit condition. The fault sensor may also be or include in some cases a voltage or current sensor, e.g. to monitor output characteristics of the battery 868.

The proximity device 866 may be or include a beacon, a distance-measuring device, a position-measuring device, or any combination thereof. A beacon is simply an electromagnetic emitter that does not itself measure distance or position, but whose output signal can be used by another device, such as a second proximity device on the mower, to determine distance or position. A distance-measuring device can determine or measure a distance to another object, such as to a distant, external beacon or a second proximity device on the mower, but cannot determine a direction to such other object, and thus it cannot determine the position of such other object, nor its own position relative to such other object. A position-measuring device can determine or measure the position of another object, such as an external beacon or a second proximity device, or the position of itself relative to such other object, and thus it can also determine or measure the distance to such other object. An example of a position-measuring device is a global positioning system (GPS) device.

The inclinometer 870 may in some cases be omitted from the handheld unit 860 unless the tilt-related capabilities described herein are of interest. The inclinometer 870 may be simple in design and function, or it may be more sophisticated and complex. In some cases the inclinometer may include two or more distinct, e.g. 1-axis, inclinometers. In some cases the inclinometer may be or include a simple switch that is activated when a tilt angle (or a tilt angle component in a given plane) exceeds a preset angle, or a plurality of such switches oriented along different planes of tilt, or a plurality of such switches having different preset angles. In some embodiments the inclinometer 870 may provide to the controller 864 an analog or digital electronic output signal that represents the actual tilt angle component in a given plane, or the actual net tilt angle, to a fairly high degree of precision, e.g. in increments of 1 degree, or 0.5 degrees, or 0.1 degrees. Stated differently, the inclinometer provides an electronic output signal that is representative of an actual tilt angle, or one or two actual tilt angle components, and substantially continuously variable over a range of angles, e.g. from 0 to at least 30, 40, 50, 60, 70, or 80 degrees. In some cases, the inclinometer 870 in the handheld unit may be the same as or similar to the inclinometer 540 in the mower. In other cases, the inclinometer 870 may be different. For example, the inclinometer 870 may have an output precision or resolution that is less than that of the inclinometer 540 to save costs and take advantage of the lower degree of precision needed for the handheld unit. For similar reasons the inclinometer 870 may be physically smaller than, and/or use less electrical power than, the inclinometer 540.

The antenna 874 functions—at a minimum—to emit or broadcast electromagnetic signals 816 to the mower, whether by a direct or indirect communication link. A direct link involves detecting the handheld-emitted signals 816 at the mower without any intermediary detection and rebroadcast. An indirect link involves detecting at the mower not the handheld-emitted signals 816 themselves, but a rebroadcast of such signals, the rebroadcast in some embodiments occurring at a different region of the electromagnetic spectrum than that of the original signals 816. If a direct communication link is used, the antennas preferably operate in the UHF band of the electromagnetic spectrum. If an indirect communication link is used (e.g. where the units communicate via one or more communication hubs), the antennas preferably operate in the SHF band. In any case, the handheld-emitted signals 816 may include information relating to the status (including change of status) of knobs, switches, buttons, joysticks, or other devices (including user input devices) that are included in the handheld unit, and may specifically include handheld unit inclinometer information and handheld unit diagnostic information.

In many embodiments the antenna 874 not only broadcasts the handheld-emitted signals 816 to the mower, but also detects mower-emitted signals such as signals 114, 514 discussed above. In such cases, the mower-emitted signals may include, for example, mower inclinometer information and mower diagnostic information. The antenna 874 is shown schematically in the figure as a single antenna structure, and so it may be, but it may also be or include two or more antenna structures, e.g. one for receiving incoming signals and one for emitting or broadcasting outgoing signals.

The display 872, if included in the handheld unit 860, displays information such as status information or warnings to the user. The display 872 thus preferably is capable of presenting information visually in the form of alphanumeric characters, graphic symbols, or both for the user to read or see. In some embodiments discussed below, the display 872 may display a tilt angle of the mower or a tilt-related indicator, such as whether the mower tilt angle is in a safe, precarious, or dangerous (unsafe) operating zone. Thus, instead of, or in addition to, displaying the actual tilt angle of the mower, the display 872 may provide a numerical, symbolic, and/or color-coded indicator of the level of danger (or safety) of the mower with regard to its tilt angle. The display 872 may be of any suitable conventional design. For example, the display 872 may be or include one or more backlit or non-backlit liquid crystal display (LCD) panels.

The emergency stop (E-stop) switch 875 is preferably large in size and red in color so the user/operator can quickly and easily locate it when they wish to immediately stop the mower. For similar reasons the switch 875 is preferably in the form of a large pushbutton which can simply be hit or tapped to activate. When the user activates the switch 875, the controller 864 causes the antenna 874 to emit a signal 816 which the controller on the mower interprets as a command to turn off the engine.

With regard to user input devices such as knobs, switches, buttons (including pushbuttons), joysticks, and the like, the reader will understand that these terms should be given their broadest reasonable interpretation unless otherwise indicated. The term "switch", for example, may include any conventional device that a user can manipulate or otherwise interact with to change an electronic state from ON to OFF, or to make electrical continuity within a circuit, or to break electrical continuity within a circuit, or the like. A switch may thus encompass any of a toggle switch, rocker switch, slider switch, rotary switch, pushbutton, or other tactile mechanical switch, as well as touch-sensitive switches including even virtual switches that may be displayed on a touch-sensitive screen such as the screen of a touch-sensitive electronic device.

The discrete light sources 876 may be or include one or more individual visible LED lamps. The controller 864 may control these light sources 876 to turn ON or OFF in a manner that communicates information to the user/operator. For example, in the absence of a display 872, a given light source 876 may be assigned to a given warning condition, whereby the light source being ON communicates to the user the given warning condition. One or more of the light sources 876 may also be made to flash on or off in a meaningful sequence, e.g., one flash may indicate a first warning condition, two flashes in rapid succession may indicate a different second warning condition, and three flashes in rapid succession may indicate a different third warning condition.

The joystick 878 may be or include a joystick of any conventional design, but preferably sized to fit conveniently on the handheld unit 860. The user manipulates the joystick 878 by pushing or pulling on the stick or lever J to deflect it from its neutral, vertical orientation. Joystick outputs, which depend on the amount and orientation of the deflection of the lever J, are fed to the controller 864, which causes the antenna 874 to emit a signals 816 which the controller on the mower interprets as commands to move the tracks or wheels at specified speeds, thus causing the mower to move. Deflection of the lever J can occur along two orthogonal planes, and orientations in between, for a full 360 degree azimuthal range and a more limited range of polar angles. The two degrees of freedom of the lever J deflection translate into two independent joystick outputs, one corresponding to the mower's left track/wheel and the other corresponding to the mower's right track/wheel. In an alternative but less preferred embodiment, the single joystick 878 can be replaced with two control sticks that each deflect in only one plane, one such control stick associated with the mower's left track and the other associated with the mower's right track.

The Enable switch 867, which may be or include a pushbutton, toggle switch, etc., is a safety mechanism that provides extra protection against hazards relating to the movement of the mower, or the cutting action of the mower blades, or both. In some embodiments of the disclosed systems, such mower movement or cutting action (or both) cannot be initiated remotely unless the user activates the Enable switch 867 within a specified time beforehand. Further details of its operation are provided below. Unlike a conventional dead-man control, the Enable switch 867 need not be activated continuously by the user.

In preferred embodiments, an activation or attempted activation of the Enable switch 867 by the user is ignored by the mower system, i.e., the system operates as if the Enable switch had not been pressed, if the joystick lever J is not in its neutral position at the time of activating the Enable switch. In other words, activation of the Enable switch 867 may be recognized only if the joystick lever J is in the neutral position at the time of such activation. This methodology may be carried out by the controller 864—i.e., the controller 864 may be configured to emit no enable signal from the antenna 874 in the described situation—or, more preferably, it may be carried out by the controller 534, whereupon the controller 864 may emit both the enable signal and a non-neutral joystick signal from the antenna 874, which are received substantially simultaneously by the controller 534 via the antenna 544 but then ignored by the controller 534.

Besides the Enable switch 867, the E-stop switch 875, and the joystick 878, other user input devices 879 may also be included in the handheld unit 860. Non-limiting examples of such other devices 879 include an Engine Start switch, a PTO switch, and a Speed Setting switch (Speed switch), any or all of which may be or include a toggle switch, pushbutton, etc. The Engine Start switch when activated by the user prompts the controller 864 to broadcast a signal 816 from the antenna 874 that causes starter on the mower to start the mower engine. The PTO switch when activated by the user prompts the controller 864 to broadcast a signal 816 that causes the PTO unit on the mower to turn ON or OFF, thus turning the cutting action of the mower blades ON and OFF. The Speed Setting switch when activated by the user prompts the controller 864 to broadcast a signal 816 that causes the mower to switch from a lower speed setting to a higher speed setting, or vice versa.

Having now described some major features and components of mowers and handheld units of the disclosed systems, we will now explain further details of some of those components, and how the controllers of the mower and handheld unit can be configured to operate individually or in combination to carry out some unique capabilities of the disclosed systems.

Figure 9:
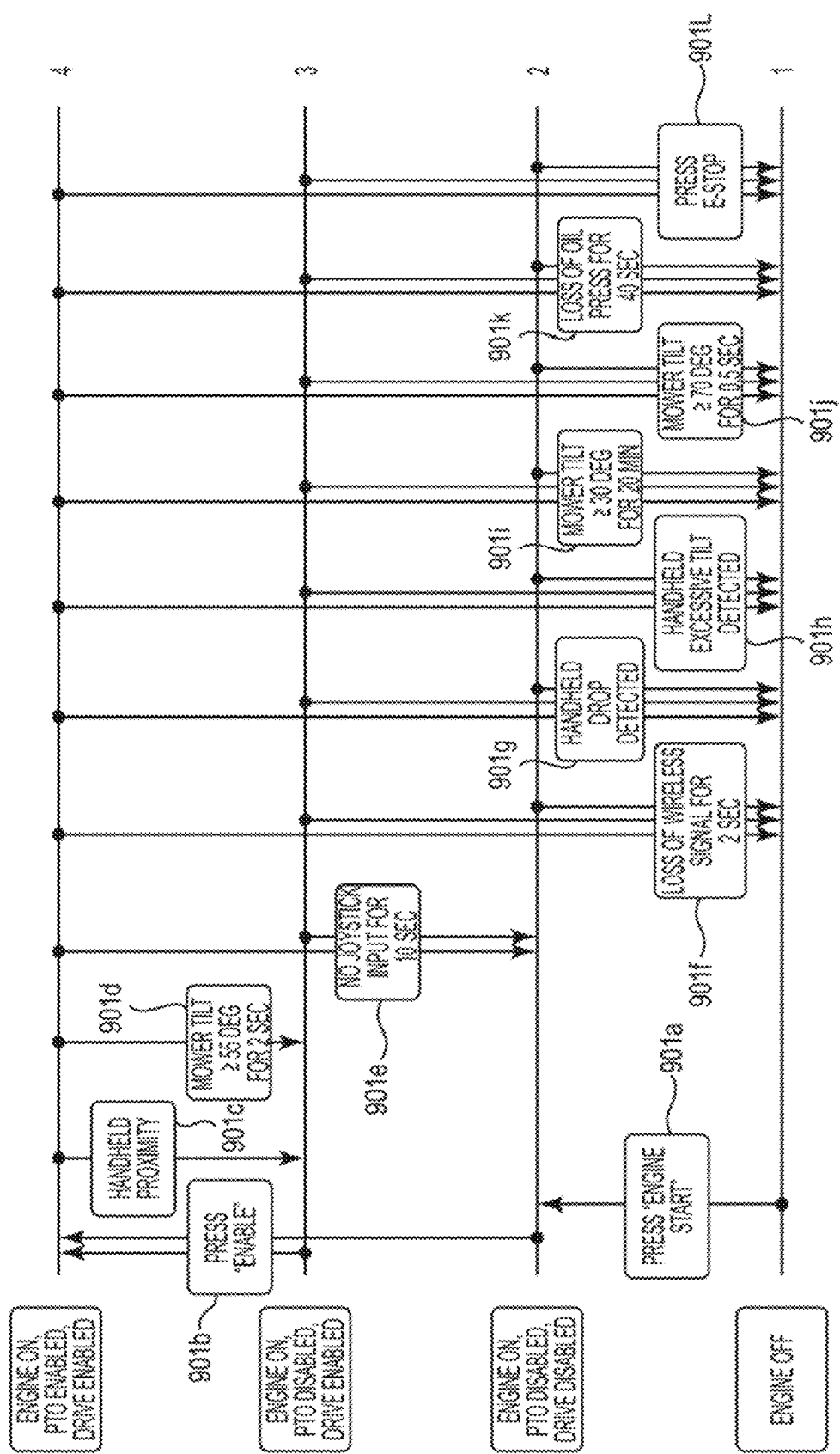
FIG. 9 is mode transition diagram for a mower system.

Four possible modes of operation of any of the disclosed mower systems are illustrated in the diagram of FIG. 9, along with action boxes that explain how transitions between such modes can be achieved. The operational modes are: (1) engine OFF; (2) engine ON, PTO disabled, drive disabled; (3) engine ON, PTO disabled, drive enabled; and (4) engine ON, PTO enabled, and drive enabled.

In operational mode (1), the mower engine is OFF, i.e., not running. Since the mower engine powers both the PTO unit and the mower tracks/wheels (via the transaxles, hydraulic transmissions, etc.), the PTO unit and drive capability of the mower are also both OFF in this mode.

In operational mode (2), the mower engine is ON, but the PTO unit is disabled, and the drive capability is also disabled. The PTO unit being disabled means that if the user tries to start the mower blades turning remotely by activating the PTO switch on the handheld unit, e.g., if the user presses a button on the handheld unit that constitutes the PTO switch, the PTO unit will not respond and will remain OFF, and the mower blades will remain stationary. This situation can be realized in at least two different ways: in a first way, the controller 864 of the handheld unit can be programmed to not respond to the user's attempted activation of the PTO switch, i.e., to not broadcast a signal 816 from the antenna 874 that would cause the PTO unit on the mower to turn ON; in a second way, the controller 864 of the handheld unit may respond to the user's action by broadcasting the signal 816 to turn the PTO unit ON, but the controller 534 of the mower may be programmed to not respond to such signal 816, which would otherwise be acted upon by the controller 534 to turn the PTO unit ON. In any case, in this operational mode the PTO unit is OFF, and, by the cooperative action of the two controllers, the user's activation of the PTO switch on the handheld unit is ineffective to activate the PTO unit.

With regard to the first way and second way discussed in the preceding paragraph, the second way may be advantageous by consolidating most or all of the logic software in the memory and controller of the mower. One practical advantage of such consolidation is to simplify the process of software updates: if and when updates to the logical operation of the system as defined by its collective software are needed, problems associated with users who forget or otherwise fail to update both the mower and the handheld unit at the same time can be avoided by placing all such software in the electronic components of the mower, and requiring the user to update only the software in the mower. Such an approach can add a level of robustness and safety to the overall mower system. Such an approach can also simplify the operation of the handheld unit by reducing its required computational operations, and allow for reduced power consumption and longer operating times of the handheld unit, since its battery 868 typically has a much smaller capacity than the battery 548 of the mower.

Still with regard to operational mode (2), the drive capability being disabled means that if the user tries to move the mower remotely by activating the joystick 878, e.g. by pushing the joystick lever J forward, backward, or sideways, the tracks of the mower will not respond, and the mower will remain stationary. As discussed above, this situation can be realized in at least two different ways: in a first way, the controller 864 of the handheld unit can be programmed to not respond to the user's attempted activation of the joystick, i.e., to not broadcast a signal 816 from the antenna 874 that would cause the mower tracks to move; in a second way, the controller 864 of the handheld unit may respond to the user's action by broadcasting the signal 816 to move the mower tracks, but the controller 534 of the mower may be programmed to not respond to such signal 816, which would otherwise be acted upon by the controller 534 to cause the mower tracks to turn and the mower to move. In any case, in this operational mode the mower's drive capability is disabled, and, by the cooperative action of the two controllers, the user's activation of the joystick on the handheld unit is ineffective to move the mower.

In operational mode (3), the mower engine is ON, but the PTO unit is disabled, and the drive capability is enabled. The PTO unit being disabled was already discussed above. The drive capability being enabled means that the user can successfully move the mower remotely by activating the joystick 878, e.g. by pushing the joystick lever J forward, backward, or sideways, so the tracks of the mower, and the mower itself, will move. By manipulating the joystick 878, the controller 864 of the handheld unit is programmed to broadcast a signal 816 from the antenna 874 which, when received by the controller 534 of the mower, causes the mower tracks to move. The cooperative action of the two controllers thus allows the mower to move.

In operational mode (4), the mower engine is ON, and both the PTO unit and the drive capability are enabled. The drive capability being enabled was already discussed above. The PTO unit being enabled means that the user can successfully turn the PTO unit ON remotely by activating the PTO switch, e.g. by pushing a button on the handheld unit that constitutes the PTO switch. When the PTO switch is activated, the controller 864 of the handheld unit is programmed to broadcast a signal 816 from the antenna 874 which, when received by the controller 534 of the mower, causes the PTO unit to turn ON. The cooperative action of the two controllers thus allows the PTO unit to turn ON, thus also turning the cutting action of the mower blades ON.

With the operational modes of FIG. 9 so defined, we can now discuss the action boxes of that figure, which represent functions and capabilities of the mower system that are programmed into one or both of the controllers 534, 864.

At box 901*a*, the user activates the Engine Start switch on the handheld unit when the system is in operational mode (1) to transition the system to mode (2). This is of course accomplished by the controller 864 broadcasting a signal 816 from the antenna 874 which, when received by the controller 534 via the antenna 544, causes the starter 538 to start the engine 530.

At box 901*b*, the user activates the Enable switch on the handheld unit when the system is in operational mode (2) to transition the system to mode (4). In mode (4), full functionality of the handheld unit and its controls is available to the user/operator, who can remotely move and maneuver the mower on the terrain using the joystick, and engage the mower blades (and thus cut grass or other vegetation on such terrain) by activating the PTO switch. In most cases, the majority of the time a user spends with the mower system will be spent in operational mode (4).

The disclosed mower systems can however be configured with one or more numerous utilitarian features many of which have the effect of increasing the safety of, or reducing the dangers to, the user/operator as well as possible bystanders. Consequently, the system can be configured to transition the system from mode (4) to one of the lower-functioning modes upon the occurrence (as determined by one or both controllers) of any of numerous actions or conditions, some of which are shown in the transition diagram of FIG. 9.

In box 901*c*, the distance D between the mower and the handheld unit (see e.g. FIG. 1) is monitored by one or both controllers. When the measured distance D is less than a stored or programmed minimum safe operating distance (MSOD), the controller(s) disable the PTO unit so as to stop the cutting action of the mower blades. This capability prevents the rotating mower blades from coming too close to the user/operator, who carries the handheld unit, but still allows the user to remotely maneuver or move the mower along the terrain. In exemplary embodiments, the MSOD may be programmed to be in a range from 4 to 20 feet, or more preferably from 7 to 12 feet.

The same transition from operational mode (4) to mode (3) can occur if a mower tilt angle, such as the net mower tilt angle $\alpha$ measured by the controller 534 based on measured component tilt angles $\alpha 1$, $\alpha 2$ from the inclinometer 540, satisfies a first tilt-related condition as shown in box 901*d*. The tilt-related condition may have both an angle component and a time component as shown, or only an angle component. For example, the tilt-related condition may be that the tilt angle (whether the net tilt angle $\alpha$ or one or both of the component tilt angles $\alpha 1$, $\alpha 2$) equals or exceeds a given limit angle αLim1 for a given period of time T1. Such a condition is not satisfied if the tilt angle exceeds αLim1 for less than the time T1. In a preferred embodiment, αLim1 may be 55 degrees, and T1 may be 2 seconds, but other reasonable values can also be selected. In another example, the time requirement may be omitted, such that the condition is satisfied if a mower tilt angle α, α1, α2 exceeds the angle αLim1 for any length of time, even momentarily.

If a transition from mode (4) to mode (3) occurs and the user/operator wishes to restore full system functionality to mode (4), they may do so by activating the Enable switch as shown at box 901b.

In box 901e, the occurrence of another condition can cause the system to transition from either mode (4) or mode (3) to mode (2), where both the PTO and the drive capability are disabled but the engine remains ON. The condition is that no joystick activity or activation occurs for a given period of time T2, i.e., the joystick lever is not moved from its neutral (zero) position for the period T2, where the beginning of the period T2 is understood to coincide with the moment the Enable switch 867 is activated. This condition may be an indication that the user has lost consciousness or encountered some other problem that prevents them from exercising adequate control over the mower, thus for a measure of safety the PTO and drive capability are shut down. Careful selection of T2 should be made, keeping it long enough to avoid excessively frequent drops from mode (4) down to mode (2) during normal cutting operations, but short enough to avoid placing the user or bystanders in undue danger. In preferred embodiments T2 may be in a range from 5 to 20 seconds, or about 10 seconds. As exemplified by the operation of box 901e, the mower system may treat the Enable switch 867 as if it had a response window limited to the time period T2. Thus, if the user activates a PTO switch on the handheld unit within the period T2 of activating the Enable switch, the PTO unit will turn ON, whereas if the user activation of the PTO switch occurs later than T2 after activating the Enable switch, the PTO unit will remain off. Similarly, if the user activates the joystick 878 within the period T2 of activating the Enable switch, the mower tracks (and the mower) will move, whereas if the user activation of the joystick occurs later than T2 after activating the Enable switch, the mower tracks and the mower will remain stationary.

In box 901f, loss of a wireless signal, optionally for a period of time T3, can cause the system to transition from any of modes (2), (3), or (4) to mode (1), i.e., total shutdown of the mower. In normal operation, one or more of the handheld-emitted signals 816 discussed above is transmitted on a continuous or semi-continuous (e.g. frequently pulsed) basis from the antenna 874 to the antenna 544, or a carrier signal or standby signal is transmitted in that manner, such that any loss of, or interference with, the wireless signal between the handheld unit and the mower can be instantly or rapidly detected and timed. In a preferred embodiment, T3 may be 2 seconds, but other reasonable values can also be selected, for example, in a range from 0.5 to 5 seconds. In another example, the time requirement may be omitted, such that the condition is satisfied for even a momentary loss of the wireless signal.

Action boxes 901g, 901h, 901i, 901j, 901k, and 901L are similar to box 901f insofar as the described conditions cause the system to transition from any of modes (2), (3), or (4) to mode (1), i.e., total shutdown of the mower.

For box 901g, the condition is the detection of a drop or jolt of the handheld unit. Such drop or jolt may be a sign of the user/operator falling, or dropping the unit on the ground. This action box and related system capability is meant to protect the operator and possible bystanders from being harmed in such an event by the active mower. Detection of the drop may be accomplished by any suitable means. In some cases, the controller 864 may monitor the output of the inclinometer 870 (which measures tilt angle(s) of the handheld unit), and may interpret a sudden or abrupt change in the output as a drop event to satisfy the condition of box 901g. In some cases, an accelerometer or other motion sensor may be included in the handheld, and the controller 864 may monitor the output of such sensor to detect a drop event.

For box 901h, the condition is the detection of an excessive tilt angle of the handheld unit. Such a condition may be a sign of the user/operator losing control of the handheld unit. Detection of this condition may be made by the controller 864 monitoring the output of the inclinometer 870, which measures tilt angle(s) of the handheld unit. The measured angle(s) may be a net tilt angle α or component tilt angles α1, α2, as shown in FIG. 4. The condition of box 901h may be satisfied when the tilt angle of the handheld unit exceeds a limit angle in a range from 20 to 55 degrees, for example, 35 degrees. The condition may be satisfied when such a tilt angle requirement is met even momentarily, or it may also include a requirement that the tilt angle condition be satisfied for a specified period of time.

Boxes 901i, 901j relate to excessive mower tilt and as such may be similar to box 901d, except that different tilt angle and/or time limits, which may arguably represent a greater danger to the user/operator than those of box 901d, are used, and except that the system transitions from any of modes (2), (3), and (4) to mode (1). Reference is made to the above discussion of box 901d, which will not be repeated again for brevity. In some cases, limit angles (αLim2, αLim3) used for one or both of boxes 901i, 901j may be greater than the limit angle αLim1 used for box 901d. In some cases, time limits (T2, T3) used for one or both of boxes 901i, 901j may be greater than the time limit T1 used for box 901d. In a preferred embodiment, box 901i uses a smaller limit angle αLim2, but a greater time limit T2, than those of box 901d, while box 901j uses a larger limit angle αLim3, but a smaller time limit T3, than those of box 901d. Specific but non-limiting exemplary values for αLim1, αLim2, αLim3 are 55, 30, and 70 degrees respectively, Specific but non-limiting exemplary values for the time limits T1, T2, T3 are 2 sec, 20 min, and 0.5 sec respectively.

For box 901k, the condition is the detection of a loss or drop in oil pressure for the mower engine, optionally for a defined length of time T4. Such a condition may be a sign of engine damage or imminent engine damage. Detection of this condition may be made by the controller 534 monitoring the output of the oil pressure sensor 537 for the mower engine 530. A sudden drop, or loss, of oil pressure causes the controller 534 to turn the engine 530 OFF. The controller 534 may optionally wait for a time period T4 before turning the engine off, and if the measured oil pressure recovers within that time period, the condition would not be satisfied, and the controller would not shut the engine off.

For box 901L, the condition is the activation of the F-stop switch 875 on the handheld unit by the user. The E-stop switch is a prominent feature on the handheld unit and easily accessed to allow the user to quickly shut the system down for any reason. By pushing the button or other mechanism constituting the E-stop switch, the controller 864 causes the antenna 874 to emit a signal 816 which the controller on the mower interprets as a command to immediately turn off the engine 530.

Figure 10:
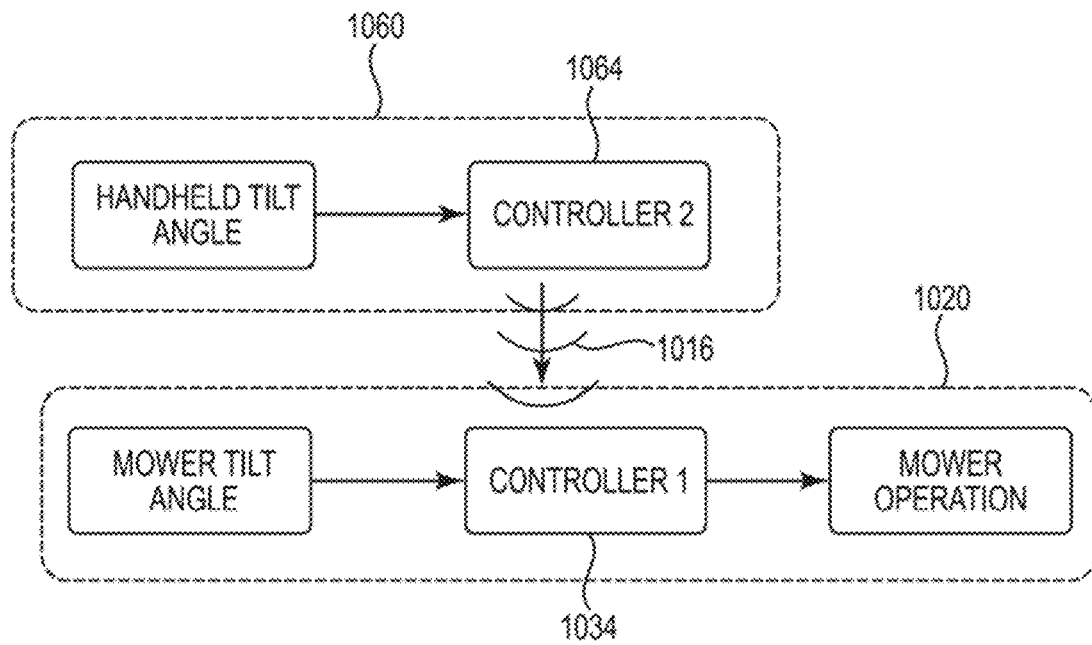
FIG. 10 is a schematic block diagram of a mower system.

A schematic block diagram of a mower system is shown in FIG. 10 to provide a simple illustration of how the system operation is dependent on both a tilt angle of a mower 1020 and a tilt angle of a handheld unit 1060. The mower 1020 may be the same as or similar to the mowers 120, 220, 520, and 620 described above, and the handheld unit 1060 may be the same as or similar to the units 160, 360, and 860 described above. The mower 1020 may have a first controller 1034 coupled to a PTO unit, a drive system, a first inclinometer, and a first antenna. The handheld unit 1060 may have a second controller 1064 coupled to user input device(s), a second inclinometer, and a second antenna such that the second controller 1064 communicates with the first controller 1034 via wireless signals 1016. The first and second controllers cooperate to control operation of the mower 1020 based on both a condition of the first inclinometer and a condition of the second inclinometer. The first controller may, for example, be configured to turn the PTO unit off when the first inclinometer satisfies a first condition, and the first condition may include the first inclinometer being tilted at a tilt angle exceeding a first limit angle. The first controller may be configured to turn the mower engine off when the first inclinometer satisfies a second condition, and the second condition may include the first inclinometer being tilted at a tilt angle exceeding a second limit angle. The first controller may be configured to turn the mower engine off when the second inclinometer satisfies a third condition, and the third condition may include the second inclinometer being tilted at a tilt angle exceeding a third limit angle.

Figure 11:
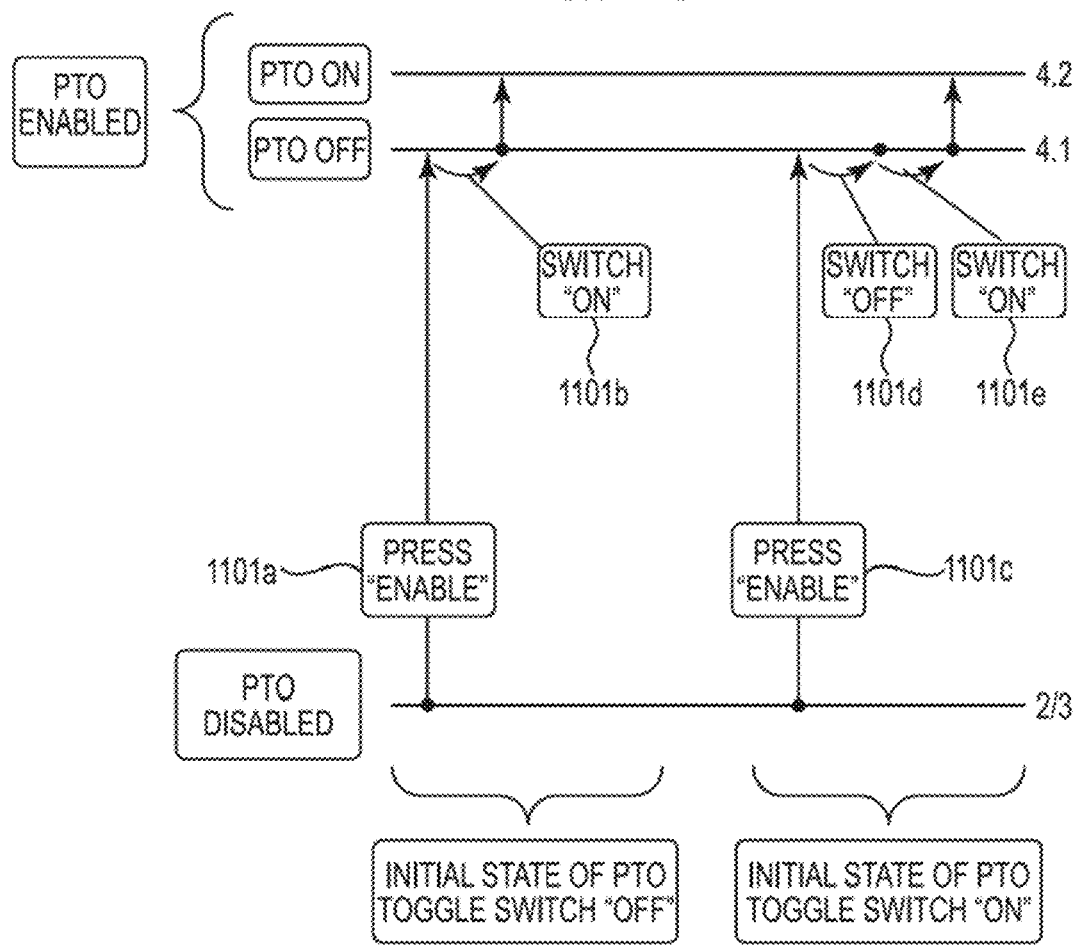
FIG. 11 is a transition diagram for a safety interlock.

Another capability that may be included in the disclosed mower systems is shown in the safety interlock transition diagram of FIG. 11. In this diagram, an operational mode (2/3) corresponds to either one of operational modes (2), (3) in FIG. 9, which have been fully described above and need not be repeated here. The operational mode (4) from FIG. 9 is split into two modes (4.1) and (4.2) in FIG. 11, the difference between these modes being that in mode (4.1) the PTO unit is actually OFF, while in mode (4.2) the PTO unit is actually ON. The PTO unit is enabled in both modes (4.1) and (4.2). With this background, FIG. 11 illustrates how the mower system is configured to respond in cases where the PTO switch is of the type that has both a stable ON state and a stable OFF state, such as with a simple toggle switch. At the time the user activates the Enable switch (see e.g. action box 901b in FIG. 9), the PTO switch may be physically in either the ON state of the OFF state, and these two possibilities are explored in FIG. 11.

On the left side of the diagram, action box 1101a represents the Enable switch 867 being activated by the user when the PTO switch is in the OFF state. In that case, to turn the PTO unit on, the user only needs to activate the PTO switch, i.e., move it to the ON state as shown by action box 1101b, which transitions the system from mode (4.1) to mode (4.2).

On the right side of the diagram, action box 1101c represents the Enable switch 867 being activated by the user when the PTO switch is (already) in the ON state. In this situation, rather than have the PTO unit immediately spring to life without the user having touched the PTO switch, a safety interlock capability may be provided. Thus, instead of the action box 1101c transitioning the system to operational mode (4.2), it transitions to mode (4.1). Then, in order to turn the PTO unit on, the user must first turn the PTO switch to the OFF state (action box 1101d), and then turn the PTO switch to the ON state (action box 1101e). Thus, the mower system will turn the PTO unit on only when the user turns the PTO switch from the OFF state to the ON state after activating the Enable switch.

The methodology of FIG. 11 need not be limited to the PTO switch but can also be applied in substantially the same manner with other user input devices on the handheld unit 860. For example, the other user input devices 879 discussed in connection with FIG. 8 may include a speed switch to regulate the speed of the mower. The speed switch may be a standard toggle switch or may otherwise be configured as a 2-state switch, with a defined "Fast" state and "Slow" state, to give the user added flexibility over the control of the mower's motion. For example, with the switch in the Fast state, the mower system may allow for maximum relative track/wheel speeds of 100 (for appropriate settings of the joystick 878, e.g. where the joystick lever J is pushed all the way forward in the 12 o'clock position as discussed below in connection with FIGS. 15-17, 19, and 20), whereas with the speed switch in the Slow state at the same joystick settings, the maximum relative speed may be only S3, where 0<S3<100, for example, S3 may be in a range from 20 to 80, or 30 to 70, or 40 to 60. Thus, when the switch is in the Slow state, all track or wheel speeds of the mower may be reduced relative to the Fast state by a constant multiplicative factor, e.g., all Slow state speeds may be 40%, or 50%, or 60% of their respective Fast state speeds.

The mower system may respond to the setting of such a speed switch in substantially the same manner as with the PTO switch setting referred to in FIG. 11. Thus, for example, if the speed switch is in the Slow state at the time the Enable switch 867 is activated, manipulation of the joystick 878 will cause the mower to move at the slower speeds; movement at the faster speeds requires the user to then turn the speed switch from the Slow state to the Fast state, after which the faster speeds are allowed. On the other hand if the speed switch is in the Fast state at the time the Enable switch 867 is activated, manipulation of the joystick 878 will cause the mower to move at the slower speeds, not the faster speeds in spite of the setting of the speed switch. In order for the system to allow the faster speeds, the user must turn the speed switch from the Fast state to the slow state (whereupon the same slow speeds are provided), and then turn the speed switch back to the Fast state, at which time the system will then allow the faster speeds. Thus, with this technique, the mower system will allow the faster speeds only when the user turns the speed switch from the Slow state to the Fast state after activating the Enable switch.

The reader is also reminded of the preferred system response discussed above in situations where the joystick lever J is not in the neutral position at the time the Enable switch 867 is activated. In such situations, the system acts as if the Enable switch had not been activated at all. A system so configured recognizes activation of the Enable switch only when the joystick lever J is in the neutral position at the time of activation.

A related but independent feature of the disclosed mower systems relates to a brake position or status and the drive system of the mower. The brake 547 mentioned above and shown in FIG. 5 may represent a mechanical hand brake, or an electronically controllable brake, or one or more sensor(s) or detector(s) associated with any such brake to allow the controller 534 to monitor the physical brake to determine whether it is ON or OFF. If the controller 534 determines that the brake is ON, then the controller 534 can be programmed to not activate the drive system regardless of what other commands would otherwise be issued by either of the controllers. Furthermore, if the controller(s) determine(s)

that the brake is ON, it or they can prevent the drive system from being enabled even upon activation of the Enable switch 867 and/or attempted activation of the joystick 878. A determination that the brake is on can thus prevent the controller 534 from supplying drive signals to the actuators 527L, 527R, at least as long as the brake is determined to be ON. Upon release of the brake, such that the controller 534 determines the brake to be OFF, operation can then return to normal. This feature advantageously prevents the user/operator from damaging the drive system/brake by preventing motion of the drive wheels 524L, 524R and related components while the brake is ON.

FIGS. 12 to 20 relate to the joystick 878 and how the mower system can be configured to react to a given position or orientation of the joystick lever J in terms of the direction and speed of the left and right tracks 523L, 523R (or 623L, 623R). In a high level overview, output signals from the joystick 878, which are indicative of the orientation of the joystick lever J, are fed to the controller 864. The signals from the joystick 878 include two independent signal channels, which may represent, or may be transformed to represent, one channel for the left track 523L and one channel for the right track 523R. This is possible because the motion of the joystick lever J has two degrees of freedom, e.g., x and y, or $\phi$ and $\theta$. The controller 864 then transmits those signals, or scaled or otherwise modified versions of them, to the mower controller 534 via the antennas 874, 544, and the handheld-emitted signals 816. The controller 534 then uses the received joystick signals (or modified versions thereof) to generate left and right drive signals for the actuators 527L, 527R according to the transformational methodologies described herein, the physical positions of the actuators being responsible for moving the respective tracks at the desired speeds by virtue of the respective hydraulic transmissions and transaxles. Note that the conversion from raw joystick output signals to left and right actuator drive signals can be performed entirely by the controller 864, or entirely by the controller 534, or by a combination thereof, but in any of these cases by the cooperative action of the controllers 864, 534.

Figure 12:
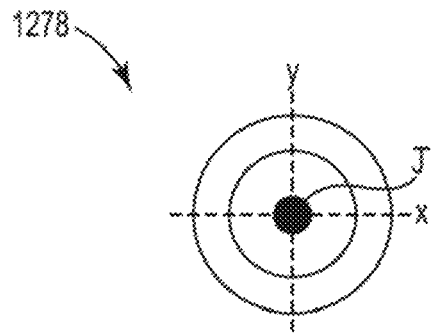
FIG. 12 is a schematic top view of a joystick for use on a remote handheld unit.

Thus, FIG. 12 is a schematic top view of a joystick 1278 for use on a remote handheld unit such as unit 860. The joystick 1278 may be the same as or similar to joystick 878. The joystick has a lever J which can be tipped by the user in any direction to control the motion of the left and right tracks of the mower, hence also its direction and speed. We may associate a local Cartesian coordinate system with the joystick, with the y-axis pointing directly forward (i.e., to the 12 o'clock position), the x-axis pointing to the right (i.e., to the 3 o'clock position), and the z-axis parallel with the lever J in its neutral position.

Figure 13:
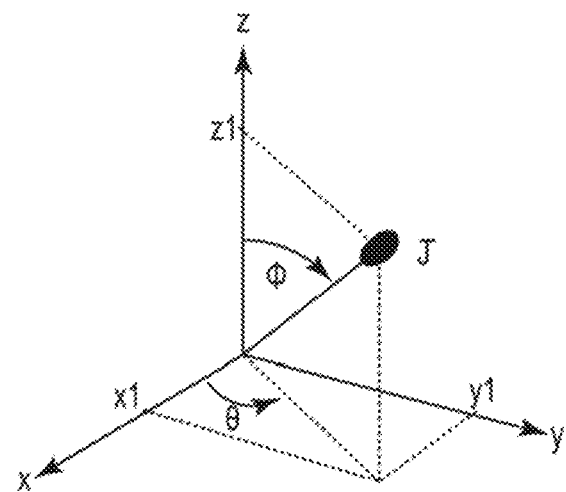
FIG. 13 is a perspective view of a spherical coordinate system showing how an arbitrary orientation of the joystick can be expressed by a polar angle $\phi$ and an azimuthal angle $\theta$.
Figure 14:
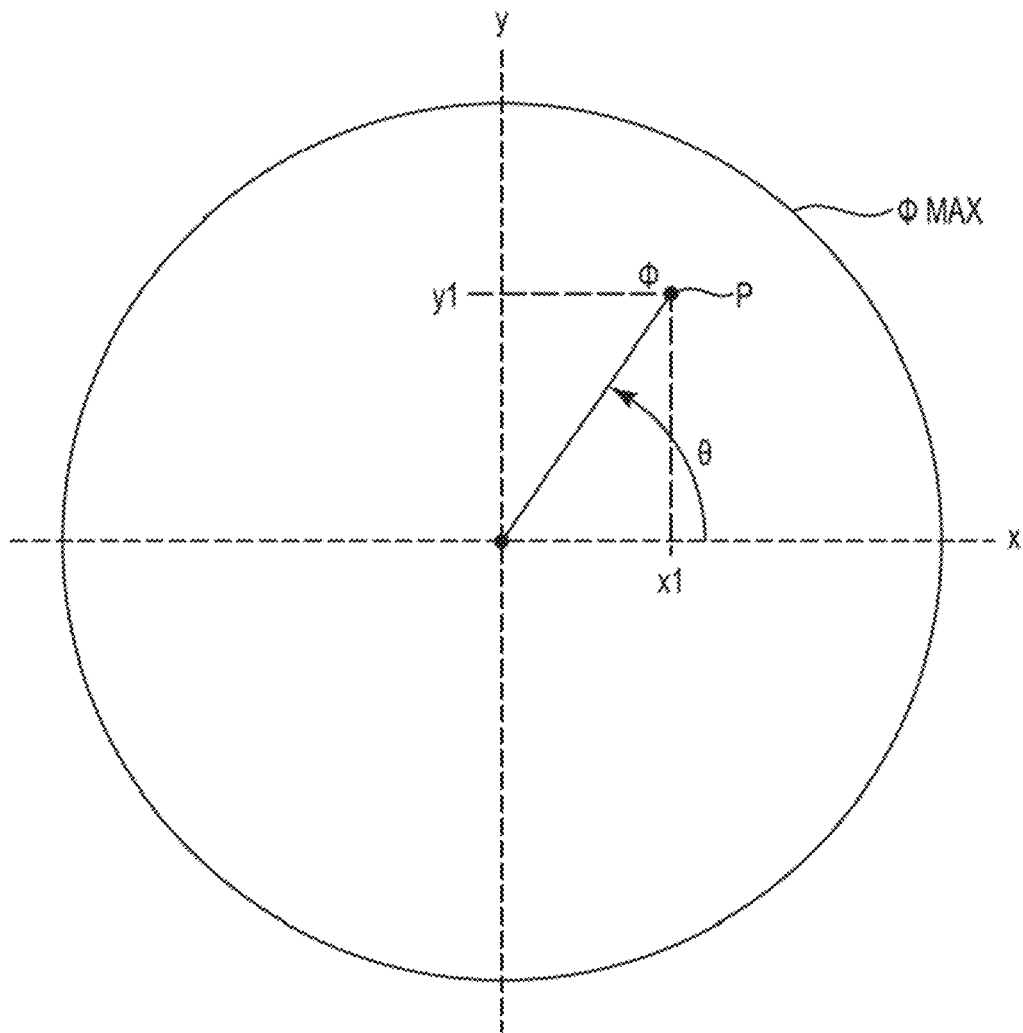
FIG. 14 is a planar representation of the ($\phi$, $\theta$) coordinate system.

These three axes can be seen in the context of a tilted lever J in an arbitrary orientation in FIG. 13. As shown, the lever's orientation can be expressed not only in terms of the x, y, and z intercepts x1, y1, z1, but also by a spherical coordinate system characterized by a polar angle $\phi$ measured relative to the z-axis, and an azimuthal angle $\theta$ measured relative to the x-axis. A planar representation of the spherical coordinate system ($\phi$, $\theta$), along with the x- and y-axes, is shown in FIG. 14. An arbitrary orientation of the joystick lever J can thus be characterized by its spherical coordinate ($\phi$, $\theta$), where $\theta$ can range from 0 to 360 degrees (or +180 to −180 degrees), and $\phi$ can range from 0 to $\phi$max, where $\phi$max is the mechanical limit of the lever's deflection. Electronic output signals of the joystick 1278 include two independent signal channels and may be provided in terms of the intercepts x1, y1, or the angles ($\phi$, $\theta$), or according to any other suitable encoding scheme.

Figure 15:
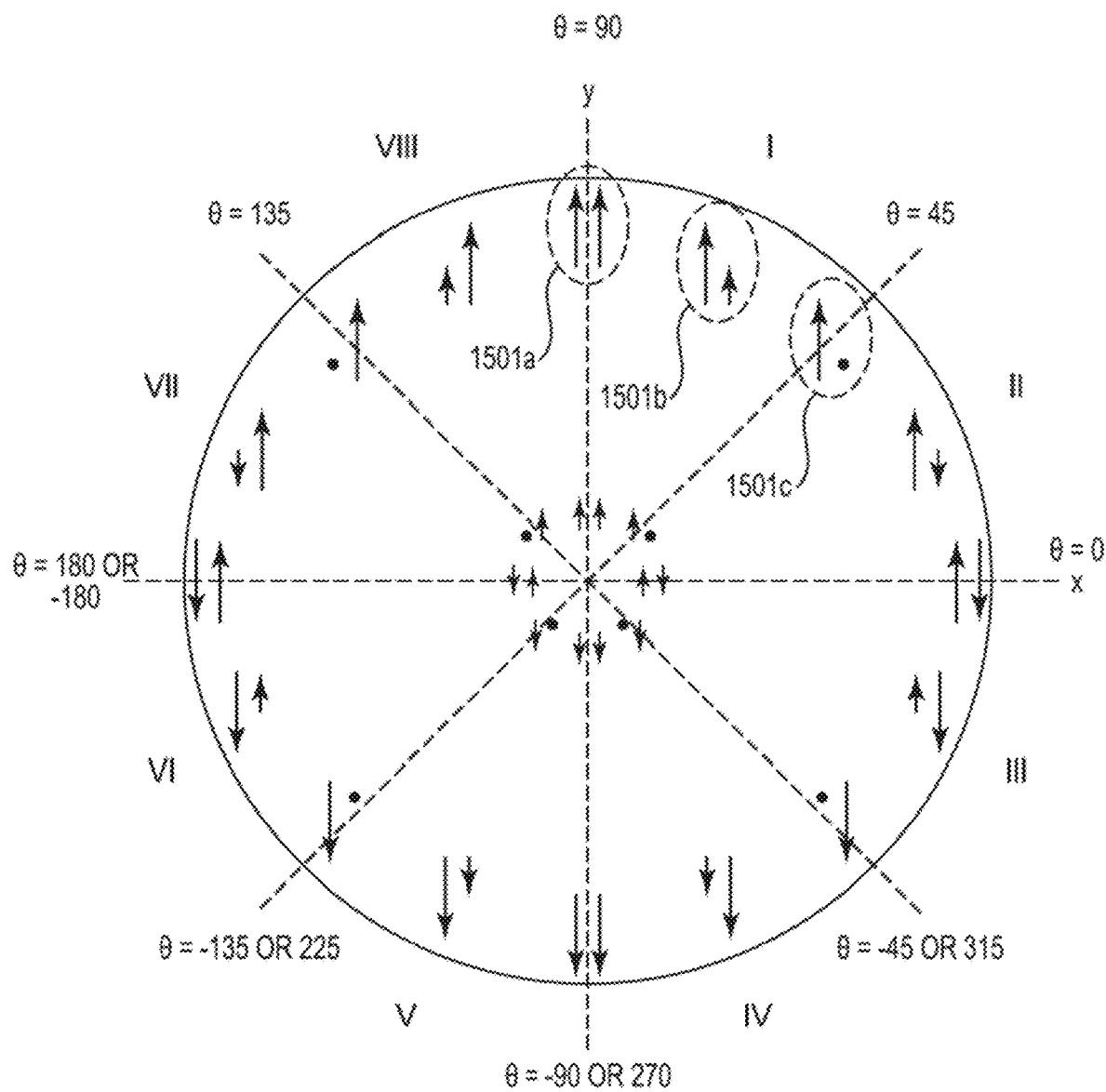
FIG. 15 is a representation similar to that of FIG. 14, but with pairs of wheel or track speed arrows superimposed thereon.

FIG. 15 is a representation similar to that of FIG. 14 but with pairs of track speed arrows superimposed thereon to illustrate a straightforward mapping function from lever orientation to left and right track speed. Three of the pairs of track speed arrows at the outer boundary ($\phi$=$\phi$max) are identified and labeled, with reference number 1501a at $\theta$=90 degrees (12 o'clock position), reference number 1501c at $\theta$=45 degrees (1:30 o'clock position), and reference number 1501b at an intermediate position around $\theta$=67.5 degrees. The $\theta$=90 position corresponds to the user pushing the lever J fully forward in an attempt to move the mower straight forward at maximum speed. Consequently, in the arrow pair 1501a, the left arrow (representing the speed of the left track 523L) and the right arrow (representing the speed of the right track 523R) are of maximum amplitude and equal to each other, to move the mower straight ahead at maximum speed.

The $\theta$=67.5 degree position corresponds to the user pushing the lever J slightly to the right in an attempt to maneuver the mower in a gradual right turn. Consequently, in the arrow pair 1501b, the left arrow (representing the speed of the left track 523L) is still the same maximum forward speed, while the right arrow (representing the speed of the right track 523R) has diminished to a slower forward speed. This difference in forward speeds of the tracks, with the left track faster than the right track, causes the mower to navigate a gradual right turn.

The $\theta$=45 degree position corresponds to the user pushing the lever J more to the right (to the 1:30 o'clock position) in an attempt to maneuver the mower in a sharper right turn. Consequently, in the arrow pair 1501c, the left arrow (representing the speed of the left track 523L) is still at the same maximum forward speed, while the right arrow (representing the speed of the right track 523R) has a zero length and is shown in FIG. 15 as a dot or point, indicating the right track is stopped. This greater difference in the speeds of the tracks causes the mower to navigate a sharper right turn than that of arrow pair 1501b.

The other arrow pairs shown in FIG. 15 are illustrated in the same fashion, with the left arrow (or dot) of each pair representing the speed of the left track 523L, and the right arrow or dot representing the speed of the right track 523R. Arrows directed upwards indicate a positive motion (a motion to move the mower forward), while arrows directed downwards indicate a negative motion (to move the mower backward). The length of the arrows indicate the relative speed of the track forward or backward, with the longest arrows indicating maximum speed, and the shortest arrows (dots) indicating minimum speed, i.e., zero speed. A zero turn maneuver to the right (i.e. clockwise) is represented at $\theta$=0 (e.g. the joystick lever pushed fully to the right at the 3 o'clock position), where the left track moves forward at maximum speed and the right track moves backward at an equal (but opposite) maximum speed. Motion of the mower straight backwards at maximum speed is represented at $\theta$=−90 or 270, at the outer boundary ($\phi$=$\phi$max) of the circle. A gentle turn of the mower backwards and to the left is represented at $\theta$=−67.5 degrees, and a sharper backwards turn to the left is represented at $\theta$=−45.

The track motions of FIG. 15 may exhibit mirror symmetry about the y-axis, e.g., a gentle forward turn to the left occurs along $\theta$=112.5 degrees, a gentle backward turn to the right occurs along $\theta$=−112.5 degrees, and a zero turn to the left (i.e. counterclockwise) occurs along $\theta$=180 degrees. A change in orientation of the joystick lever radially (with θ fixed and φ changing) causes the motion of each track to monotonically increase as φ increases and monotonically decrease as φ decreases, such that at the center of the circle (φ=0, the neutral position of the joystick lever) both tracks are stopped, and the mower is at rest.

Also in the mapping function of FIG. 15, the left wheel speed remains constant for a fixed polar angle φ along the range θ=0 to 90 (forward motion) and θ=180 to 270 (backward motion), and diminishes monotonically from θ=0 to −45 (forward motion) and from θ=180 to 135 (backward motion), and increases monotonically from θ=−45 to −90 (backward motion) and from θ=135 to 90 (forward motion). The right wheel speed behaves in a similar but counterpart fashion as can be seen from the figure.

The mapping function of FIG. 15 gives the user full maneuverability and motion control over the mower by appropriate manipulation of the joystick 878. However, modifications of the mapping function can be made to enhance fine control capabilities. The modifications stem from the recognition that, with regard to fine control capability of the joystick, most users would care more about the region near θ=90 or θ=−90, i.e., near-straight-line motion and gentle turns, than the region near θ=0 or θ=180, i.e., near-zero turns and extremely sharp turns. Thus, if the sensitivity of the mower's motion to small changes in azimuthal angle θ could be reduced in the regions near θ=90 or −90 at the expense of increased sensitivity in the regions near θ=0 or 180, it may provide an overall enhancement for the user. Such an enhancement is possible by shifting the azimuthal angle of the places at which one track motion is zero and the other is non-zero, which we refer to as "null points" or "corners" of the mapping function. The corners of the mapping function of FIG. 15 occur at θ=45 and −45, and by symmetry at 135 and −135. The sensitivity enhancement described above can be accomplished by shifting the null points or corners to the angles θ=θ1, −θ1, 180−θ1, and 180+θ1 where θ1 is less than 45 but greater than 0, as shown in the modified mapping function of FIG. 16.

Figure 16:
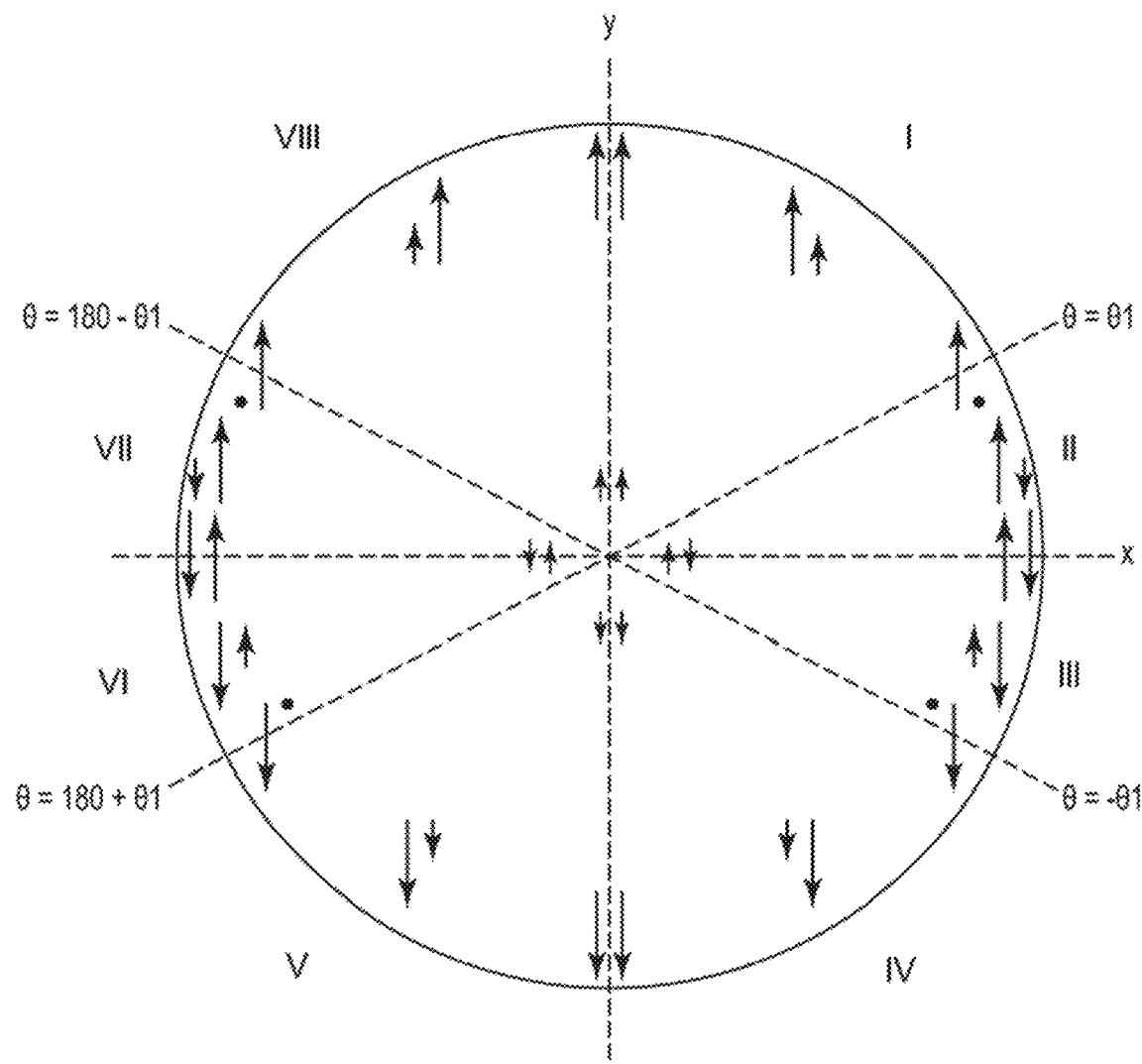
FIG. 16 is a representation similar to that of FIG. 15, but where null points have been shifted to provide enhanced fine control capabilities.

Thus, FIG. 16 presents a mapping function of joystick orientation to track motion substantially similar to FIG. 15, except that the null points or corners have been shifted to enhance fine control capabilities. In preferred embodiments, the reduced corner angle θ1 is in a range from 10 to 40 degrees, more preferably 20 to 30 degrees. The increased azimuthal range between null points in the forward direction (the range equal to 180−2*θ1, compared to 90 degrees for FIG. 15) gives the user better fine motion control for such forward-type maneuvers than the approach of FIG. 15. Similarly, the increased azimuthal range between null points in the backward direction (the range again equal to 180−2*θ1) gives the user better fine motion control for such backward-type maneuvers than the approach of FIG. 15. These enhancements in forward and reverse motion control of course come at the expense of reduced fine motion control in the near-zero-turn regions near θ=0 and 180.

Figure 17:
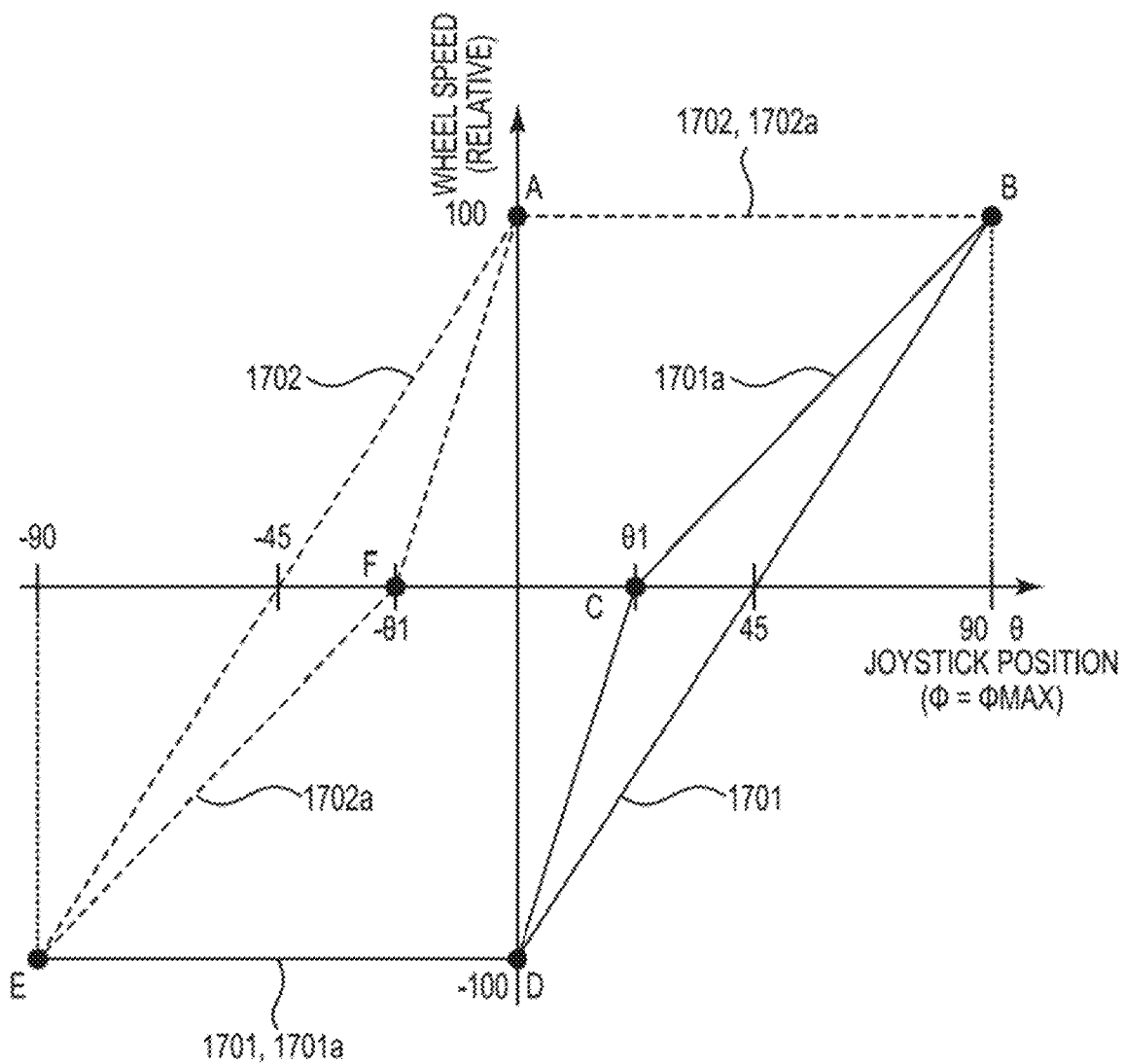
FIG. 17 is a graph of relative wheel speed versus joystick angle $\theta$, at a fixed polar angle $\phi$, for both standard operation and enhanced fine control operation.
Figure 18:
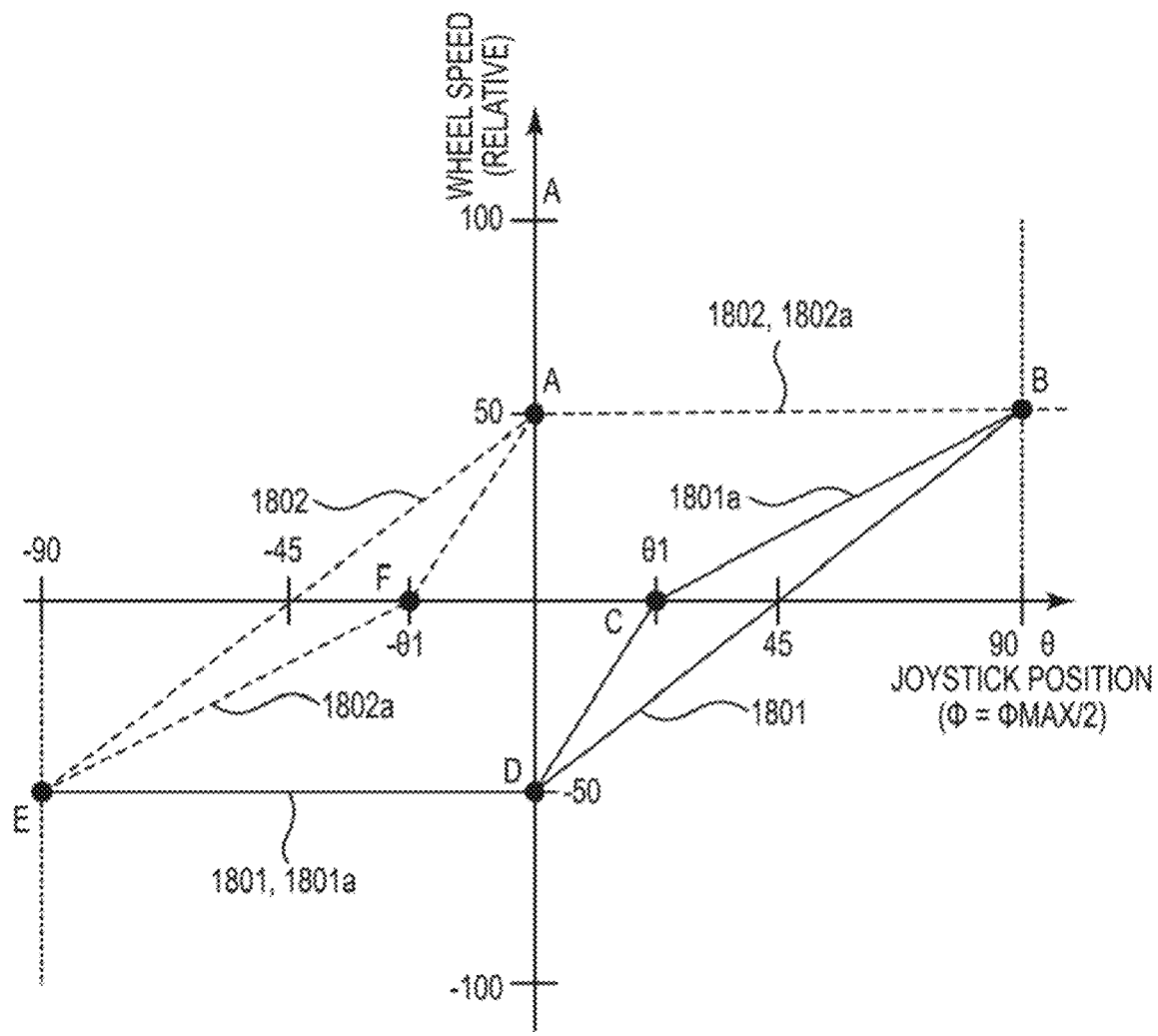
FIG. 18 is a graph similar to that of FIG. 17, but where the polar angle $\phi$ is fixed at $\phi max/2$.

FIGS. 17 and 18 illustrate the difference between the mapping functions of FIGS. 15 and 16 in an alternative way. These figures plot the relative wheel speed (or track speed) versus the azimuthal position θ of the joystick, for a fixed polar angle φ. The wheel speed axis goes from 0 (stopped; no motion) to 100 (maximum forward speed), and to −100 (maximum negative speed). The azimuthal angle θ (see FIGS. 13-16) goes from −90 to 90; operation over the remaining range from θ=90 to 180 to 270 can be ascertained by symmetry. The polar angle φ (see again FIGS. 13-16) is assumed to be its maximum value climax in FIG. 17, and half of that value in FIG. 18.

In FIG. 17, a conventional right track response consistent with FIG. 15 is shown by curve or function 1701, and a counterpart left track response consistent with FIG. 15 is shown by curve or function 1702. Curve 1701 extends from a point E to D to B. Curve 1702 extends from point E to A to B. A so-called corner-enhanced right track response consistent with FIG. 16 is shown by curve or function 1701a, and the counterpart corner-enhanced left track response consistent with FIG. 16 is shown by curve or function 1702a. Curve 1701a extends from point E to D to C to B. Curve 1702a extends from point E to F to A to B. As can be seen by inspection of the figure, the slope of curve 1701a from point C to point B is less in magnitude than that of curve 1701 over the range from θ=θ1 to 90, indicating reduced sensitivity of the track motion to the joystick orientation. Likewise, the slope of curve 1702a from point E to point F is less in magnitude than that of curve 1702 over the range from θ=−90 to −θ1, again indicating reduced sensitivity of the track motion to the joystick orientation.

FIG. 18 is substantially the same as FIG. 17 except that the polar angle φ of the joystick lever is assumed to be halfway between the maximum value and the neutral position, i.e., φ=φmax/2. Because of this reduced joystick deflection, the greatest wheel speed (track speed) achieved is only 50 relative units. Otherwise, a conventional right track response consistent with FIG. 15 is shown by curve or function 1801, and a counterpart left track response consistent with FIG. 15 is shown by curve or function 1802. Curve 1801 extends from a point E to D to B. Curve 1802 extends from point E to A to B. A so-called corner-enhanced right track response consistent with FIG. 16 is shown by curve or function 1801a, and the counterpart corner-enhanced left track response consistent with FIG. 16 is shown by curve or function 1802a. Curve 1801a extends from point E to D to C to B. Curve 1802a extends from point E to F to A to B. As can be seen by inspection of the figure, the slope of curve 1801a from point C to point B is less in magnitude than that of curve 1801 over the range from θ=θ1 to 90, indicating reduced sensitivity of the track motion to the joystick orientation. Likewise, the slope of curve 1802a from point E to point F is less in magnitude than that of curve 1802 over the range from θ=−90 to −θ1, again indicating reduced sensitivity of the track motion to the joystick orientation.

Another modification that can be made to the baseline mapping function of FIG. 15 (or the track response curves 1701, 1702 of FIG. 17) stems from the recognition that the fastest track speeds used for forward motions at or near θ=90 can be excessive if used for zero-turns and near-zero turns in the region at or near θ=0. In other words, if the user deflects the joystick lever to (φ=φmax, θ=0) to make the mower execute a clockwise zero-turn, or to (φ=φmax, θ=180) to make the mower execute a counterclockwise zero-turn, slower track speeds may be needed (relative to track speeds desired for straight forward or straight backward motion) for the user to maintain full control over the maneuver, to prevent the mower from spinning too fast. Thus, if the maximum track speed could be reduced in the regions near θ=0 and θ=180 compared to the maximum track speed at θ=90 or θ=−90, it may provide an overall enhancement for the user. Such an enhancement, which we may refer to as a spin enhancement, is possible by adjusting the track speed (wheel speed) in the regions associated with the zero-turn maneuvers.

Figure 19:
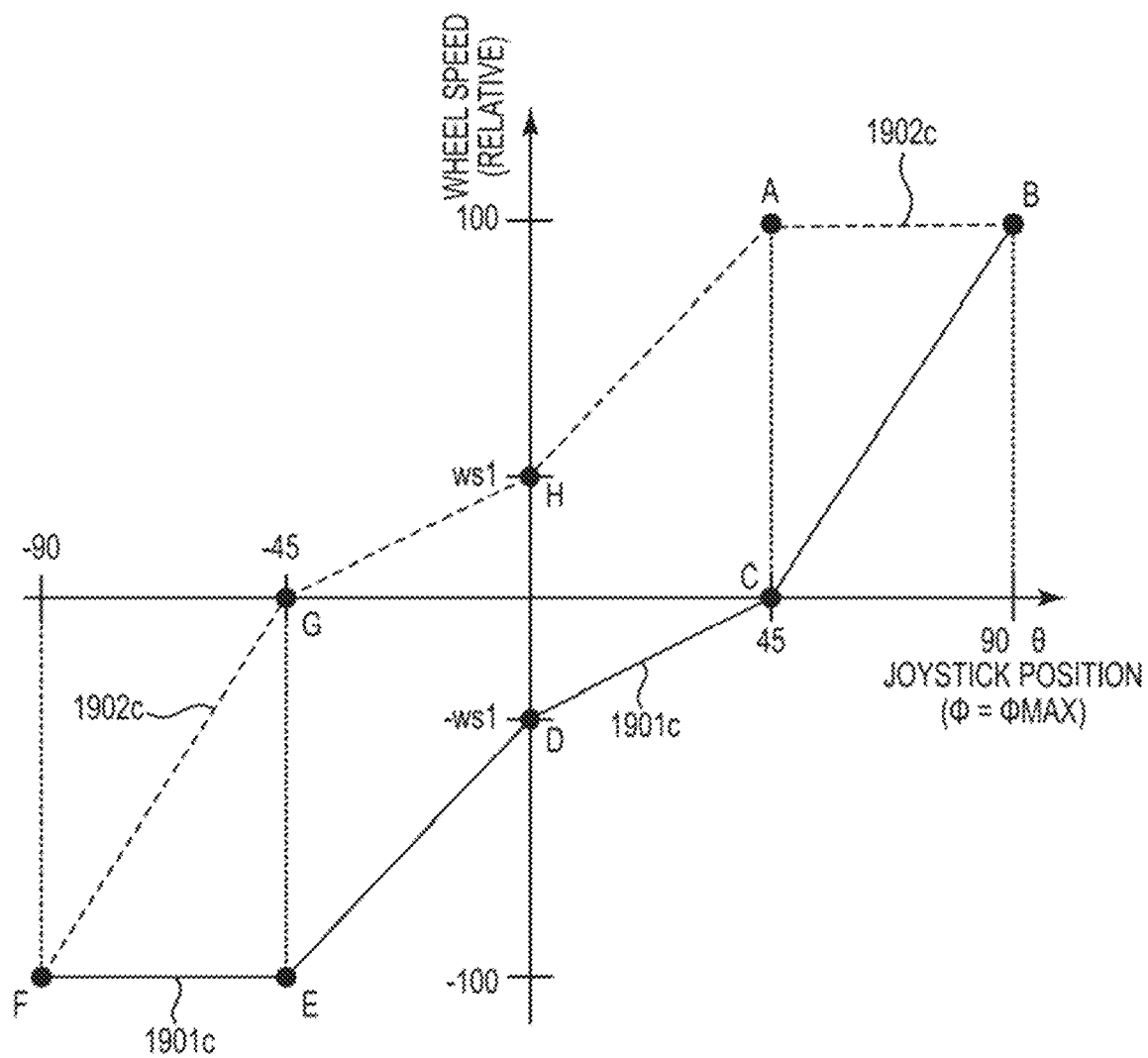
FIG. 19 is a graph similar to the standard operation curve of FIG. 17, but where a spin function modification has been applied to provide better zero-turn user control.

FIG. 19 plots left and right track (wheel) response curves similar to curves 1701, 1702 of FIG. 17, but where such a spin enhancement has been employed to reduce the track (wheel) speed at or near θ=0 (and θ=180). A spin-enhanced right track response is shown by curve or function 1901c, and a counterpart spin-enhanced left track response is shown by curve or function 1902c. The maximum track (wheel) speed at 0=0 has been reduced from 100 (or −100) to a smaller value ws1 (or −ws1). The reduced speed value ws1 may be in a range from 30 to 70 on a relative scale where the maximum achievable track (wheel) speed is 100. Curve 1901c extends from a point F to E to D to C to B, and may be piecewise linear, or at least monotonic, between such points. The section from point F to E has a fixed track (wheel) speed of −100. Curve 1902c extends from point F to G to H to A to B, and may likewise be piecewise linear or at least monotonic between points. The section from point A to B has a fixed track (wheel) speed of 100. FIG. 19 thus illustrates track response curves in which a spin function modification has been applied to provide better zero-turn user control.

Figure 20:
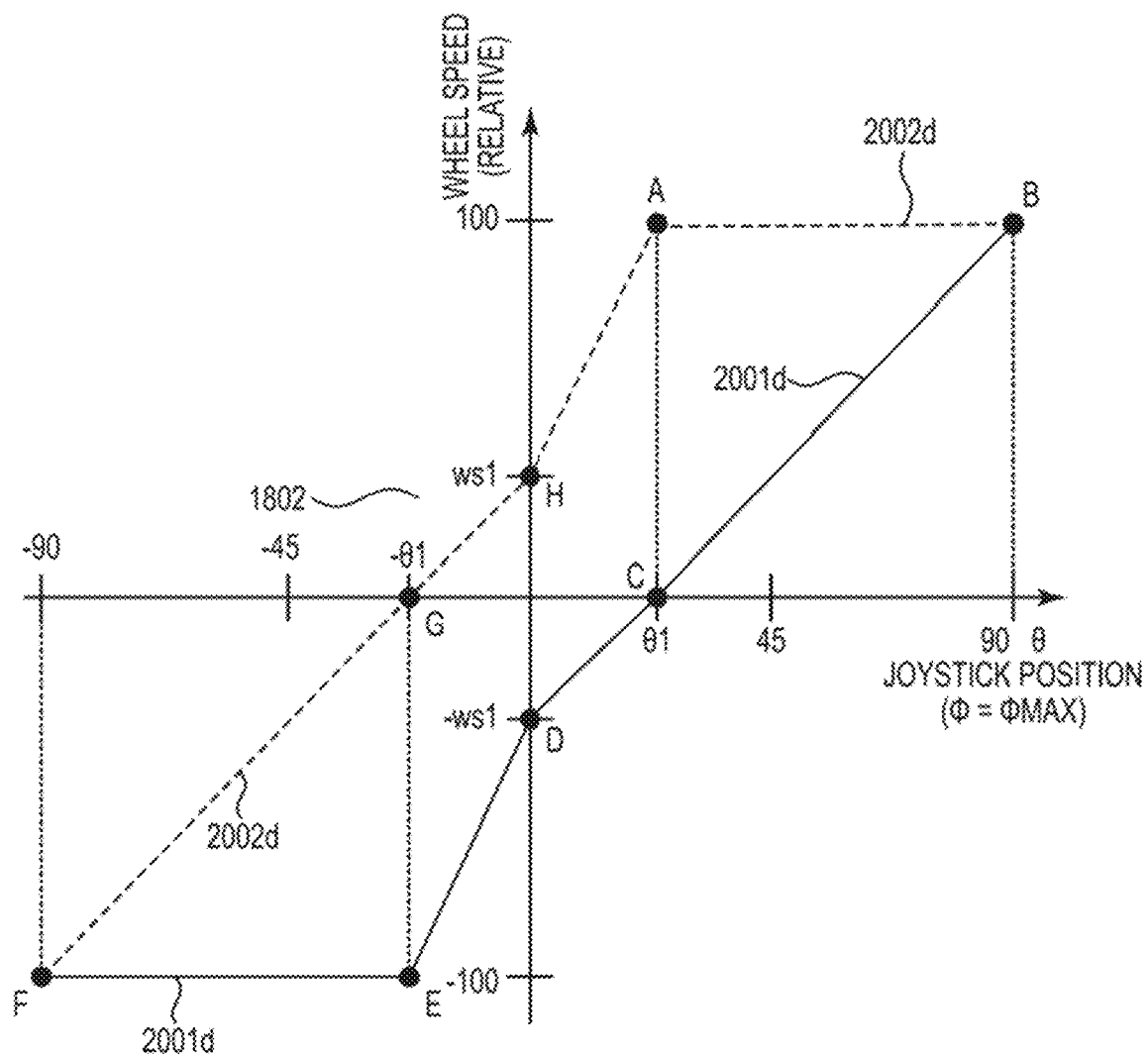
FIG. 20 is a graph similar to the enhanced fine control operation curve of FIG. 17, but where the spin function modification has been applied.

FIG. 20 is another graph of track (wheel) response curves similar to those of FIGS. 17-19, but which incorporate both a corner enhancement, as in curves 1701a, 1702a of FIG. 17, and a spin enhancement, as in curves 1901c, 1902c of FIG. 19. The result is a corner-and-spin-enhanced right track response 2001d which extends from point F to E to D to C to B, where ws1 and θ1 have the same meanings as in FIGS. 17 and 19. The curve 2001d may be piecewise linear, or at least monotonic, between the points, and the section from F to E may have a fixed track (wheel) speed of −100. A corner-and-spin-enhanced left track response 2002d extends from point F to G to H to A to B. The curve 2002d may be piecewise linear, or at least monotonic, between such points, and the section from A to B may have a fixed track (wheel) speed of 100. A mower system programmed to respond in the fashion of FIG. 20 to the joystick 878 may provide the reduced forward and reverse steering sensitivity associated with the corner enhancement, and the reduced turning speed of the mower associated with the spin enhancement.

As described above, remote control of the mower's motion can be achieved by the cooperative action of at least the joystick 878, the controllers 864, 534, the antennas 874, 544, the handheld-emitted signals 816, and the actuators 527L, 527R. Output signals from the joystick 878, which are responsive to the orientation of the joystick lever J, are fed to the controller 864. The controller 864 transmits those joystick signals, or modified versions of them, by the antenna 874 as handheld-emitted signals 816, which are received by the controller 534 through the antenna 544. The controller 534 uses the received signals to generate left and right drive signals for the actuators 527L, 527R. The original joystick signals from the joystick 878 are related to the left and right actuator drive signals by a transfer function. The transfer function may be applied entirely by the controller 864, or entirely by the controller 534, or by a combination thereof and optionally with other system component(s), but in any case by the cooperative action of the controllers 864, 534.

Figure 21:
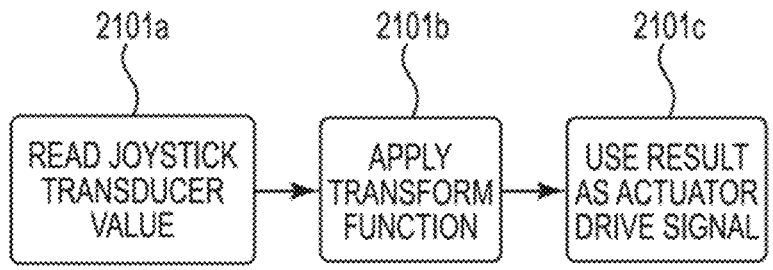
FIG. 21 is a schematic flow diagram showing a process for transforming joystick transducer values to actuator drive signals.

A high level illustration of these relationships is shown in the schematic flow diagram of FIG. 21. At box 2101a, the joystick transducer value(s) is or are read. At box 2101b, a transform function is applied to the joystick values. The operation of box 2101b may be accomplished by one system component, such as one of the controllers 864, 534, or by several system components in a sequence of steps. At box 2101c, the transformed signals are applied to inputs of the actuators 527L, 527R as drive signals.

Figure 22:
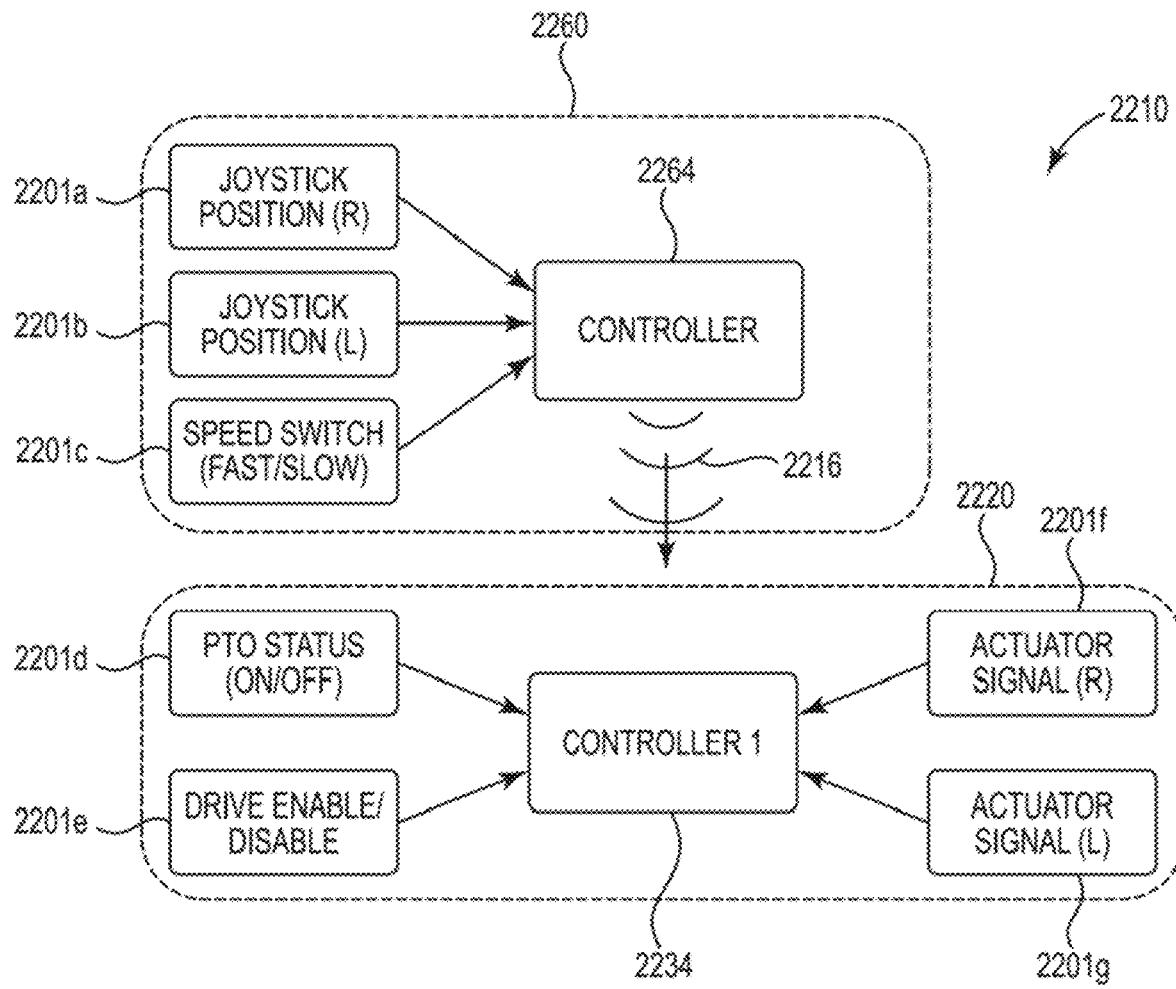
FIG. 22 is another schematic block diagram of a mower system, showing some elements relevant to speed control.

FIG. 22 is another schematic block diagram of a mower system 2210 that shows some system elements relevant to speed control. The system 2210 includes a handheld unit 2260 and a mower 2220, which may be the same as or similar to handheld units and mowers respectively discussed above. The handheld unit 2260 includes a controller 2264, which receives two channels of joystick position information shown at boxes 2201a, 2201b from a joystick such as previously discussed joystick 878. The controller 2264 may also have a wired connection to a speed switch 2201c, which may be one of the other user input devices 879 discussed in connection with FIG. 8. The speed switch 2201c may be configured as a 2-state switch, with a "Fast" state and a "Slow" state, to give the user added flexibility over the control of the mower's motion. In some embodiments, the system 2210 may respond to the speed switch 2201c as follows: when the switch is in the Fast state, the transform function of FIG. 21 is a given defined relationship, such as any of those depicted in FIGS. 15-20; but when the switch is in the Slow state, all track or wheel speeds may be reduced relative to the Fast state by a constant multiplicative factor, e.g., all Slow state speeds may be 40%, or 50%, or 60% of their respective Fast state speeds, such that the transform function is also reduced accordingly. The Speed switch signal and the joystick signals are received and optionally processed in whole or in part by the controller 2264, which transmits the information to the controller 2234 via the handheld signals 2216. The controller 2234 also receives PTO status information from box 2201d and drive enable/disable information from box 2201e, one or both of which may optionally be communicated by the handheld signals 2216 from the handheld unit 2260. In any case, the controller 2234 takes the information received from these various sources, processes it as necessary, and provides outputs in the form of actuator drive signals 2201f, 2201g for the right and left actuators to move the mower in the desired fashion as described herein. For example, if the drive enable/disable information from box 2201e is in a "disable" state, then the actuator drive signals 2201f, 2201g will remain neutral regardless of the other inputs, and the mower will remain stationary. If the Speed switch 2201c is in a Slow state, then the actuator drive signals 2201f, 2201g will be modified (relative to the Fast state) to cause the track (wheel) speeds to be reduced uniformly by a given factor.

According to another exemplary system feature, the speed control or transfer function provided by the system 2210 is also dependent on the status of the PTO unit, i.e., whether the PTO unit is ON or OFF. In particular, the system may reduce the track (wheel) speeds uniformly by a given factor when the PTO unit is ON. This reduction factor may be the same as, or greater than, or less than, the reduction factor associated with the Speed switch.

Figure 23:
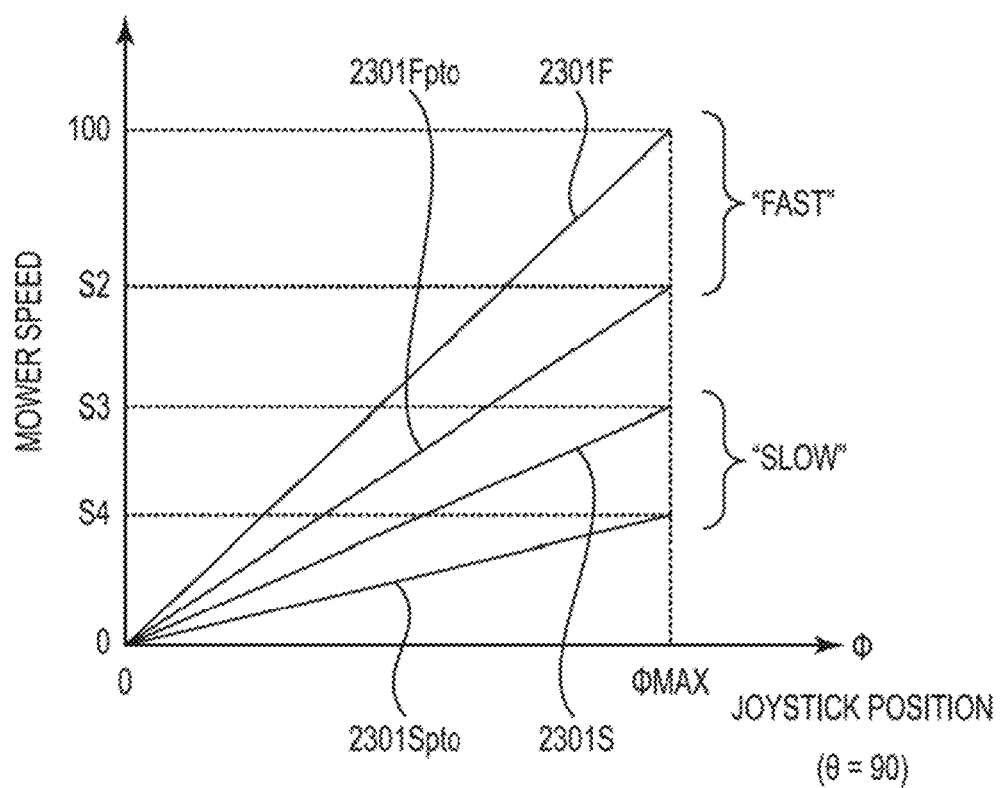
FIG. 23 is a graph of relative mower speed versus joystick angle $\phi$, showing curves for various speed control settings.

Thus, FIG. 23 illustrates a system response graph of relative mower speed (which may be the track or wheel speed of a given left or right track or wheel of the mower) versus the joystick polar angle ϕ for a fixed azimuthal angle θ of 90 degrees, i.e., for the joystick lever J at the 12 o'clock position. The mower speed ranges from 0 (stopped) to 100 (highest achievable speed for the given track/wheel). The polar angle of the joystick lever ranges from 0 (neutral position) to ϕmax. The curves shown on the graph, each of which may be mathematically linear or at least monotonic, represent the system response for different combinations of the Speed switch 2201c and the PTO status 2201d. Curve 2301F, which ranges from 0 at ϕ=0 to 100 at ϕ=ϕmax, is for the Speed switch in a Fast state, and the PTO status OFF. Curve 2301Fpto, which ranges from 0 at $\phi=0$ to S2 at $\phi=\phi$max, is for the Speed switch in a Fast state, and the PTO status ON. The speed S2 may be less than 100 but greater than 0. Curve 2301S, which ranges from 0 at $\phi=0$ to S3 at $\phi=\phi$max, is for the Speed switch in a Slow state, and the PTO status OFF. The speed S3 may be less than S2 but greater than 0. Curve 2301Spto, which ranges from 0 at $\phi=0$ to S4 at $\phi=\phi$max, is for the Speed switch in a Slow state, and the PTO status ON. The speed S4 may be less than S3 but greater than 0. Thus, as described, 100>S2>S3>S4>0. In some embodiments, S2 can be less than S3, such that 100>S3>S2>S4>0. In other embodiments, S2 can equal S3, such that 100>S2=S3>S4>0.

Thus, the controllers 534, 864 may cooperate to reduce the speed of the mower by virtue of the sensed status of the PTO unit, or by the sensed status of the Speed switch, or both in a cumulative fashion. Changing the Speed switch from a Fast state to a Slow state may reduce a maximum speed of the mower by 40%, 50%, or 60%, or by an amount in a range from 20% to 80%, or 30% to 70%, or 40% to 60%. A change in status of the PTO unit from OFF to ON may likewise reduce a maximum speed of the mower by 40%, 50%, or 60%, or by an amount in a range from 20% to 80%, or 30% to 70%, or 40% to 60%.

Figure 24:
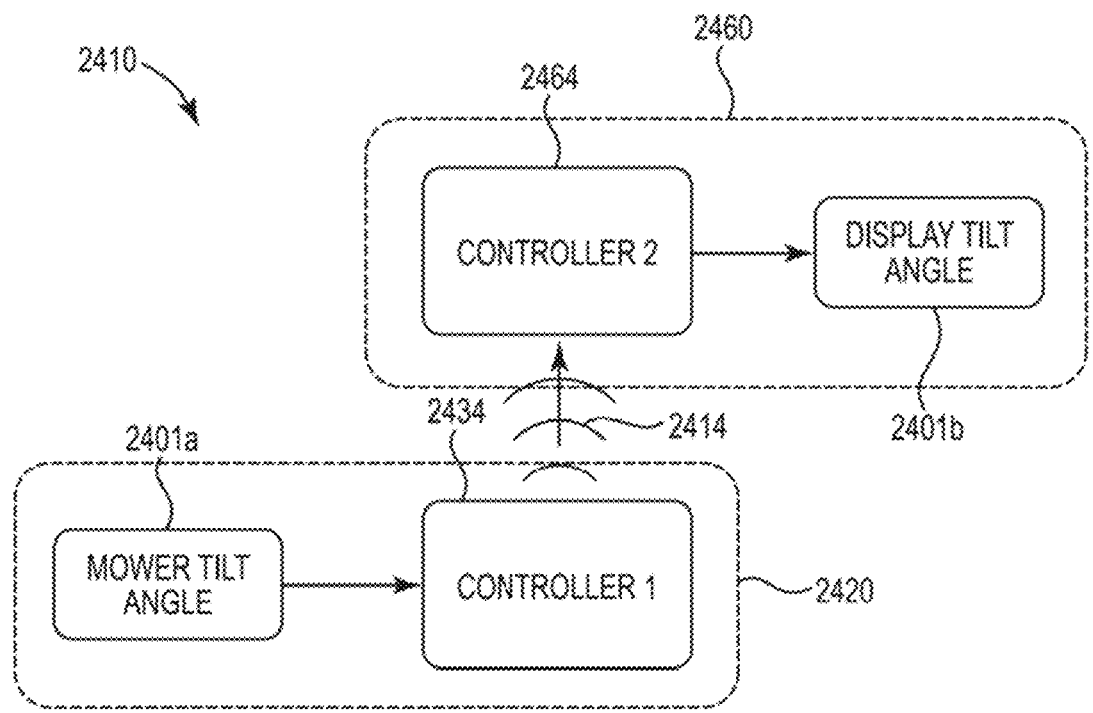
FIG. 24 is another schematic block diagram of a mower system, showing how mower tilt angle can be displayed on the remote handheld unit.

Another exemplary system feature is schematically illustrated in the schematic block diagram of FIG. 24. There, a mower system 2410 includes a mower 2420 and a handheld unit 2460, which may be the same as or similar to other mower and handheld units respectively discussed above. The mower 2420 has a controller 2434, which measures a mower tilt angle 2401*a* using an on-board inclinometer as discussed above. The handheld unit 2460 also has a controller 2464, which receives information about the mower tilt angle via mower-emitted signals 2414. The handheld unit 2460 may also have its own inclinometer, but in some cases it may be omitted. The controller 2464 has a wired connection to a display or visual indicator such as display 872 described above, and the controller 2464 causes the tilt angle of the mower to appear on the display 872, as shown at box 2401*b*. Such a display conveniently informs the user/operator on a real-time basis of how much the mower is tilted. This information is of particular value since the operator can use it to steer the mower away from a dangerously sloped area as the displayed slope angle gets too close to a given limit angle.

As discussed above, instead of or in addition to displaying the actual tilt angle of the mower, the display 872 may provide a numerical, symbolic, and/or color-coded indicator of a tilt angle-related parameter such as the level of danger, or the level of safety, of the mower with regard to its tilt angle. For example, the display 872 may provide a danger value from 0 to 5, with 0 corresponding to a lowest range of tilt angle and 5 corresponding to a highest, and most dangerous, range of tilt angle. The tilt-related parameter may thus be a crude or low resolution approximation or indication of the actual tilt angle of the mower. In some cases, in addition to or instead of displaying the actual tilt angle on an alphanumeric display, such a crude approximation of the tilt angle can be displayed on the display 872 or on a series of discrete light sources mounted on the handheld unit, such as the discrete light sources 876. In one example, three such discrete sources can be used, and the controller 864 may illuminate only one such source when the tilt angle is in a first, lowest range, and two such sources when the tilt angle is in a second, higher range, and all three such sources when the tilt angle is in a third, highest range. In even simpler embodiments, a single discrete light source can be used to provide the user/operator with at least some information about the mower's tilt angle. For example, the discrete light source may be or comprise a multi-color LED bulb capable of selectively emitting at least two different colors, e.g., red light or green light, or both, or combinations of red, green, or blue light. Such a light source can be controlled to emit, for example, green light when the mower's tilt angle is in a first, lowest range, and red (warning) light when the tilt angle is in a second, higher range, e.g., a range at or near a dangerous operating condition as discussed in connection with FIG. 9.

Figure 25:
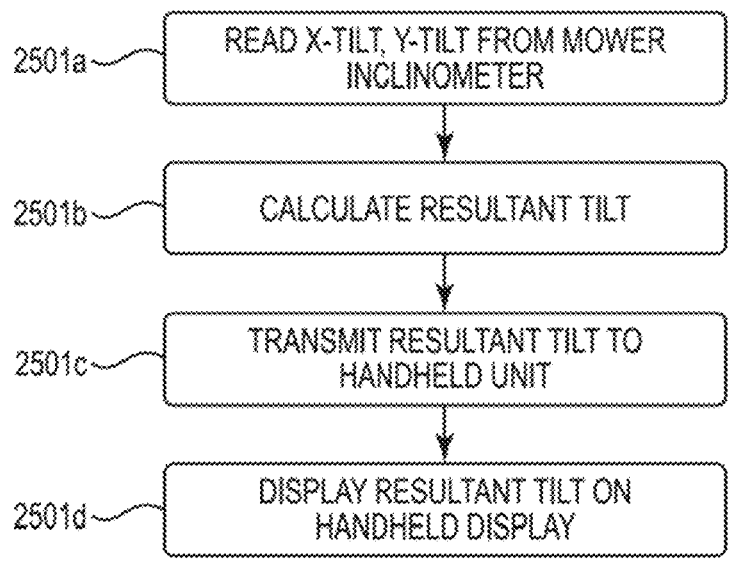
FIG. 25 is a schematic flow diagram showing a process for calculating and displaying a tilt angle of the mower on the remote handheld unit.

Related to the operation of system 2410 of FIG. 24 is the schematic flow diagram of FIG. 25. The flow diagram shows a process for calculating and displaying a tilt angle of the mower on the remote handheld unit. In box 2501*a*, two channels of mower tilt information, such as the component tilt angles $\alpha 1$, $\alpha 2$ discussed above, are read from an inclinometer 540 by the controller 534. In box 2501*b*, the controller 534 and/or other system component(s) calculate a resultant or net tilt angle $\alpha$ of the mower, such as using the equation above containing the inverse sine and square root functions. In box 2501*c*, the calculated net tilt $\alpha$ is transmitted wirelessly to the handheld unit. In box 2501*d*, the calculated tilt a is displayed on the handheld unit, e.g. by the controller 2464.

Figure 26:
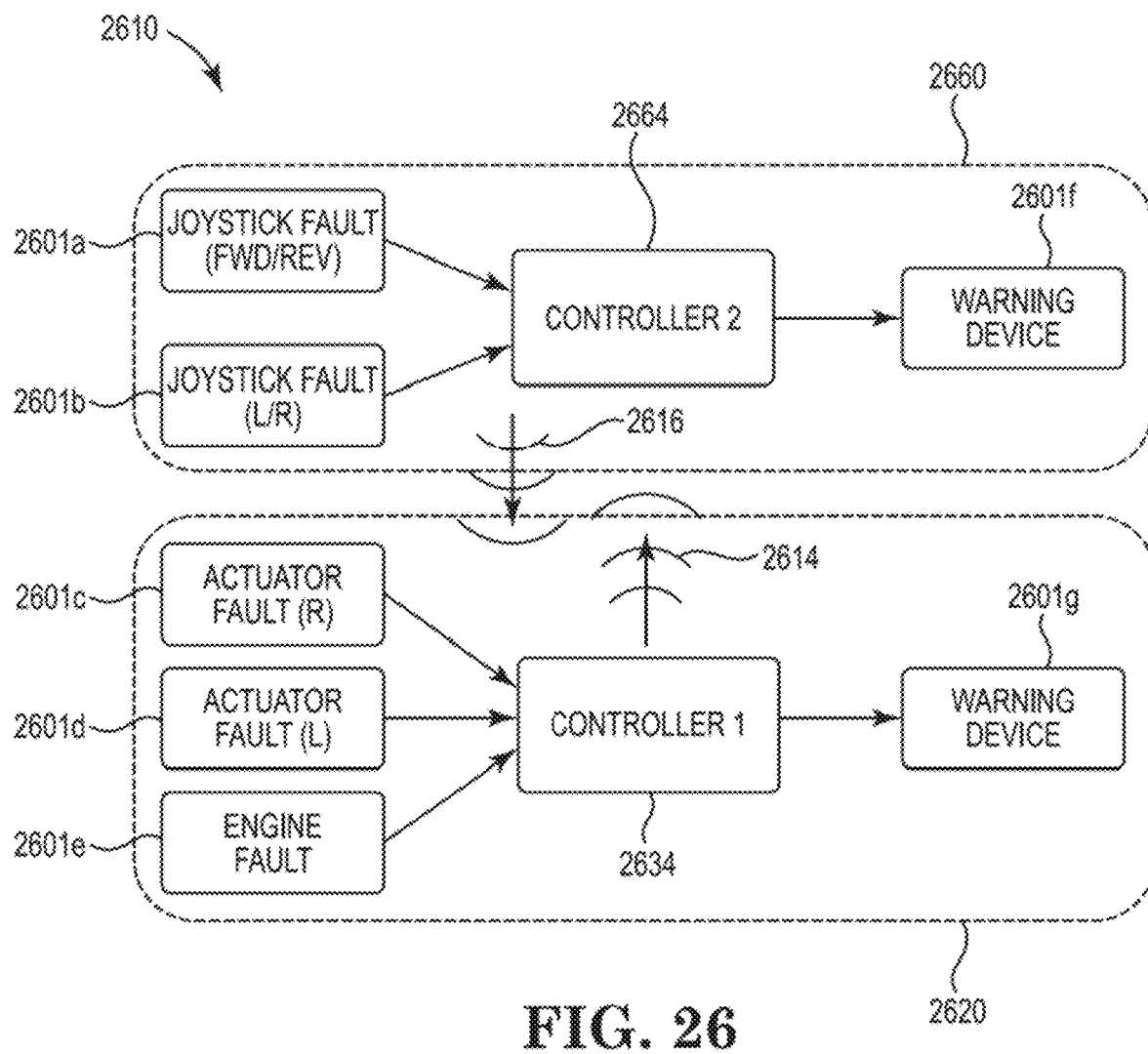
FIG. 26 is a schematic block diagram of a mower system, showing how diagnostic information can be shared between mower and handheld unit, and displayed or otherwise communicated to the user.

Still another exemplary system feature is schematically illustrated in the schematic block diagram of FIG. 26. This diagram shows how diagnostic information can be shared in a mower system 2610 between the mower and the handheld unit, and displayed or otherwise communicated to the user/operator such as through a visual or auditory warning signal that may emanate from the mower, from the handheld unit, or both.

In particular, a handheld unit 2660 collects diagnostic information on one or more of its on-board components and communicates that information to the mower 2620 via handheld-emitted signals 2616, while the mower 2620 collects diagnostic information on one or more of its on-board components and communicates that information to the handheld unit via mower-emitted signals 2614. On-board components of the handheld unit may include a joystick, which may provide a first diagnostic fault indicator 2601*a* and a second diagnostic fault indicator 2601*b*, a controller 2664, and a warning device 2601*f*. On-board components of the mower may include right and left actuator fault indicators 2601*c*, 2601*d*, an engine fault indicator 2601*e*, a controller 2634, and a warning device 2601*g*. A warning device 2601*f* on the handheld unit alerts the user/operator of a diagnostic condition that pertains to diagnostic information from the handheld unit, diagnostic information from the mower, or both. The warning device 2601*f* on the handheld unit 2660 may be or include one or more of the discrete light source(s) 876, the display 872, or a speaker or horn (not shown). The warning device 2601*g* on the mower 2620 may be or include one or both of the horn 541 and the light(s) 542.

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application, Not to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any orientations and relative positions, in addition to those described above.

The following is a non-limiting list of items of the present disclosure.

Item 1. A mower, comprising:
a frame;
an engine attached to the frame;
mower blades attached to the frame and selectively coupled to the engine by a power takeoff (PTO) unit;
a controller configured to separately control the PTO unit and the engine; and
an inclinometer attached to the frame and coupled to the controller, the inclinometer providing an inclinometer output indicative of a tilt angle of the frame;
wherein the controller is configured to turn the PTO unit off but keep the engine on when the inclinometer output satisfies a first condition, and configured to turn the engine off when the inclinometer output satisfies a second condition.

Item 1.1. The mower of item 1, wherein the first condition comprises the tilt angle exceeding a first value, and the second condition comprises the tilt angle exceeding a second value greater than the first value.

Item 1.2. The mower of item 1.1, wherein the first condition comprises the tilt angle exceeding the first value for a first nonzero time interval, and the second condition comprises the tilt angle exceeding the second value for a second time interval, the second time interval being less than the first time interval.

Item 1.3. The mower of item 1, wherein the first condition comprises the tilt angle exceeding a first value, and the second condition comprises the tilt angle exceeding a second value less than the first value.

Item 1.4. The mower of item 1.3, wherein the first condition comprises the tilt angle exceeding the first value for a first nonzero time interval, and the second condition comprises the tilt angle exceeding the second value for a second time interval, the second time interval being greater than the first time interval.

Item 1.5. The mower of item 1, wherein the first condition comprises a first nonzero time interval and the second condition comprises a second time interval, the second time interval being less than the first time interval such that the second condition can be satisfied before the first condition is satisfied.

Item 1.6. The mower of item 1, wherein the mower includes a drive system controlled by the controller, and wherein the controller is configured to keep the drive system enabled when the inclinometer satisfies the first condition.

Item 1.7. The mower of item 1, further including an oil pressure sensor mechanically coupled to the engine and electrically coupled to the controller, and wherein the controller is configured to turn the engine off when an output of the oil pressure sensor satisfies a third condition.

Item 1.8. The mower of item 1, wherein the controller includes a central processing unit (CPU) and a memory unit.

Item 1A. A mower, comprising:
an engine;
a power takeoff (PTO) unit;
a controller configured to separately control the PTO unit and the engine, the controller including a central processing unit (CPU) and a memory unit in which instructions are stored; and
an inclinometer coupled to the controller, the inclinometer providing an inclinometer output indicative of a tilt angle of the mower;
wherein the instructions are configured to turn the PTO unit off but keep the engine on when the inclinometer output satisfies a first condition, and configured to turn the engine off when the inclinometer output satisfies a second condition.

Item 1A.1. The mower of item 1A, wherein the first condition comprises the tilt angle exceeding a first value, and the second condition comprises the tilt angle exceeding a second value greater than the first value.

Item 1A.2. The mower of item 1A.1, wherein the first condition comprises the tilt angle exceeding the first value for a first nonzero time interval, and the second condition comprises the tilt angle exceeding the second value for a second time interval, the second time interval being less than the first time interval.

Item 1A.3. The mower of item 1A, wherein the first condition comprises the tilt angle exceeding a first value, and the second condition comprises the tilt angle exceeding a second value less than the first value.

Item 1A.4. The mower of item 1A.3, wherein the first condition comprises the tilt angle exceeding the first value for a first nonzero time interval, and the second condition comprises the tilt angle exceeding the second value for a second time interval, the second time interval being greater than the first time interval.

Item 1A.5. The mower of item 1A, wherein the first condition comprises a first nonzero time interval and the second condition comprises a second time interval, the second time interval being less than the first time interval such that the second condition can be satisfied before the first condition is satisfied.

Item 1A.6. The mower of item 1A, wherein the mower includes a drive system controlled by the controller, and wherein the instructions are configured to keep the drive system enabled when the inclinometer satisfies the first condition.

Item 1A.7. The mower of item 1A, further including an oil pressure sensor mechanically coupled to the engine and electrically coupled to the controller, and wherein the instructions are configured to turn the engine off when an output of the oil pressure sensor satisfies a third condition.

Item 1A.8. The mower of item 1A, wherein the mower is a slope mower.

Item 1B. A method of operating a slope mower having an engine, a power takeoff (PTO) unit, an inclinometer, and a controller configured to separately control the PTO unit and the engine, the method comprising:
turning the PTO unit off but keeping the engine on when an output of the inclinometer satisfies a first condition, and
turning the engine off when the output of the inclinometer output satisfies a second condition.

Item 1B.1. The method of item 1B, wherein the mower includes a drive system controlled by the controller, and wherein the method includes keeping the drive system enabled when the output of the inclinometer satisfies the first condition.

Item 2. A mower, comprising:
an engine;
a power takeoff (PTO) unit;
a drive system that includes a left drive wheel, a right drive wheel, a left actuator, and a right actuator, the left actuator having a position that controls a speed of the left drive wheel, and the right actuator having a position that controls a speed of the right drive wheel;
a controller coupled to the PTO unit and to the left and right actuators of the drive system;
wherein the controller is configured to provide first drive signals to the first and second actuators when the PTO unit is off, and second drive signals to the first and second actuators when the PTO unit is on, the first drive signals characterized by a first maximum drive speed and the second drive signals characterized by a second maximum drive speed, the second maximum speed being less than the first maximum speed.

Item 2.1. The mower of item 2, wherein the second maximum speed is in a range from 20% to 80% of the first maximum speed.

Item 2.2. The mower of item 2, wherein the second maximum speed is in a range from 40% to 60% of the first maximum speed.

Item 2.3. The mower of item 2, wherein the controller is also configured to receive a joystick input and a speed switch input independent of the PTO unit.

Item 2.4. The mower of item 2, wherein the mower is a slope mower.

Item 2.5. The mower of item 2, wherein the controller includes a central processing unit (CPU) and a memory unit in which instructions are stored.

Item 2.6. The mower of item 2, further comprising an inclinometer coupled to the controller.

Item 2.7. The mower of item 2, wherein the controller is configured to provide control signals to the PTO unit to turn the PTO unit on or off.

Item 2.8. The mower of item 2, wherein the left and right actuators are linear actuators.

Various modifications and alterations of this invention will be apparent to those skilled in the art without departing from the spirit and scope of this invention, which is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

What is claimed is:

1. A mower, comprising:
a frame;
an engine attached to the frame;
mower blades attached to the frame and selectively coupled to the engine by a power takeoff (PTO) unit;
a controller configured to separately control the PTO unit and the engine; and
an inclinometer attached to the frame and coupled to the controller, the inclinometer providing an inclinometer output indicative of a tilt angle of the frame;
wherein the controller is configured to turn the PTO unit off but keep the engine on when the inclinometer output satisfies a first condition, and configured to turn the engine off when the inclinometer output satisfies a second condition.

2. The mower of claim 1, wherein the first condition comprises the tilt angle exceeding a first value, and the second condition comprises the tilt angle exceeding a second value greater than the first value.

3. The mower of claim 2, wherein the first condition comprises the tilt angle exceeding the first value for a first nonzero time interval, and the second condition comprises the tilt angle exceeding the second value for a second time interval, the second time interval being less than the first time interval.

4. The mower of claim 1, wherein the first condition comprises the tilt angle exceeding a first value, and the second condition comprises the tilt angle exceeding a second value less than the first value.

5. The mower of claim 4, wherein the first condition comprises the tilt angle exceeding the first value for a first nonzero time interval, and the second condition comprises the tilt angle exceeding the second value for a second time interval, the second time interval being greater than the first time interval.

6. The mower of claim 1, wherein the first condition comprises a first nonzero time interval and the second condition comprises a second time interval, the second time interval being less than the first time interval such that the second condition can be satisfied before the first condition is satisfied.

7. The mower of claim 1, wherein the mower includes a drive system controlled by the controller, and wherein the controller is configured to keep the drive system enabled when the inclinometer satisfies the first condition.

8. The mower of claim 1, further including an oil pressure sensor mechanically coupled to the engine and electrically coupled to the controller, and wherein the controller is configured to turn the engine off when an output of the oil pressure sensor satisfies a third condition.

9. The mower of claim 1, wherein the controller includes a central processing unit (CPU) and a memory unit.

10. A mower, comprising:
an engine;
a power takeoff (PTO) unit;
a controller configured to separately control the PTO unit and the engine, the controller including a central processing unit (CPU) and a memory unit in which instructions are stored; and
an inclinometer coupled to the controller, the inclinometer providing an inclinometer output indicative of a tilt angle of the mower;
wherein the instructions are configured to turn the PTO unit off but keep the engine on when the inclinometer output satisfies a first condition, and configured to turn the engine off when the inclinometer output satisfies a second condition.

11. The mower of claim 10, wherein the first condition comprises the tilt angle exceeding a first value, and the second condition comprises the tilt angle exceeding a second value greater than the first value.

12. The mower of claim 11, wherein the first condition comprises the tilt angle exceeding the first value for a first nonzero time interval, and the second condition comprises the tilt angle exceeding the second value for a second time interval, the second time interval being less than the first time interval.

13. The mower of claim 10, wherein the first condition comprises the tilt angle exceeding a first value, and the second condition comprises the tilt angle exceeding a second value less than the first value.

14. The mower of claim 13, wherein the first condition comprises the tilt angle exceeding the first value for a first nonzero time interval, and the second condition comprises the tilt angle exceeding the second value for a second time interval, the second time interval being greater than the first time interval.

15. The mower of claim 10, wherein the first condition comprises a first nonzero time interval and the second condition comprises a second time interval, the second time interval being less than the first time interval such that the second condition can be satisfied before the first condition is satisfied.

16. The mower of claim 10, wherein the mower includes a drive system controlled by the controller, and wherein the instructions are configured to keep the drive system enabled when the inclinometer satisfies the first condition.

17. The mower of claim 10, further including an oil pressure sensor mechanically coupled to the engine and electrically coupled to the controller, and wherein the instructions are configured to turn the engine off when an output of the oil pressure sensor satisfies a third condition.

18. The mower of claim 10, wherein the mower is a slope mower.

19. A method of operating a slope mower having an engine, a power takeoff (PTO) unit, an inclinometer, and a controller configured to separately control the PTO unit and the engine, the method comprising:
  turning the PTO unit off but keeping the engine on when an output of the inclinometer satisfies a first condition, and
  turning the engine off when the output of the inclinometer output satisfies a second condition.

20. The method of claim 19, wherein the mower includes a drive system controlled by the controller, and wherein the method includes keeping the drive system enabled when the output of the inclinometer satisfies the first condition.

* * * * *